US011474225B2

(12) United States Patent
Dent et al.

(10) Patent No.: US 11,474,225 B2
(45) Date of Patent: Oct. 18, 2022

(54) PULSE DIGITAL MIMO RADAR SYSTEM

(71) Applicant: Uhnder, INC., Austin, TX (US)

(72) Inventors: Paul W. Dent, Pittsboro, NC (US); Curtis Davis, St. Louis, MO (US); Murtaza Ali, Cedar Park, TX (US)

(73) Assignee: Uhnder, Inc., Austin, TX (US)

( * ) Notice: Subject to any disclaimer, the term of this patent is extended or adjusted under 35 U.S.C. 154(b) by 381 days.

(21) Appl. No.: 16/674,543

(22) Filed: Nov. 5, 2019

(65) Prior Publication Data

US 2020/0150256 A1 May 14, 2020

Related U.S. Application Data

(60) Provisional application No. 62/757,958, filed on Nov. 9, 2018.

(51) Int. Cl.
*G01S 13/10* (2006.01)
*H01Q 21/06* (2006.01)
(Continued)

(52) U.S. Cl.
CPC .......... *G01S 13/106* (2013.01); *G01S 7/282* (2013.01); *G01S 7/295* (2013.01); *G01S 13/284* (2013.01);
(Continued)

(58) Field of Classification Search
CPC ........ G01S 13/106; G01S 7/282; G01S 7/295; G01S 13/284; H01Q 19/108; H01Q 21/062
See application file for complete search history.

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0725480 11/2011
EP 2374217 4/2013
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Thomas M Hammond, III
(74) *Attorney, Agent, or Firm* — Gardner, Linn, Burkhart & Ondersma LLP

(57) ABSTRACT

A chip-implementation of a millimeter wave MIMO radar comprises transmitters for transmitting short bursts of digitally modulated radar carrier signals and receivers for receiving delayed echoes of those signals. Various signal formats defined by the number of bits per transmit burst, the transmit burst duration, the receive period duration, the bitrate, the number of range bins, and the number of bursts per scan, facilitate the choice of modulating bit patterns such that when correlating for target echoes over an entire scan, the correlation codes for different ranges and different transmitters are mutually orthogonal or nearly so. In the event of imperfect orthogonality, simple orthogonalization schemes are revealed, such as subtraction of strong already-detected target signals for better detecting weaker signals or moving targets that are rendered non-orthogonal by their Doppler shift.

18 Claims, 21 Drawing Sheets

(51) Int. Cl.
    *H01Q 19/10*         (2006.01)
    *G01S 7/295*         (2006.01)
    *G01S 7/282*         (2006.01)
    *H01Q 1/32*          (2006.01)
    *G01S 13/28*         (2006.01)
    *G01S 7/288*         (2006.01)
    *G01S 13/931*        (2020.01)

(52) U.S. Cl.
    CPC ......... *H01Q 1/3233* (2013.01); *H01Q 19/108* (2013.01); *H01Q 21/062* (2013.01); *G01S 7/288* (2013.01); *G01S 13/931* (2013.01)

(56) References Cited

U.S. PATENT DOCUMENTS

| | | |
|---|---|---|
| 3,735,398 A | 5/1973 | Ross |
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,612,547 A | 9/1986 | Itoh |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A | 4/1991 | Thompson |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,888,491 B2 | 5/2005 | Richter |
| 6,975,246 B1 | 12/2005 | Trudeau |
| 7,119,739 B1 | 10/2006 | Struckman |
| 7,130,663 B2 | 10/2006 | Guo |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,667,637 B2 | 2/2010 | Pedersen et al. |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,115,672 B2 | 2/2012 | Nouvel et al. |
| 8,154,436 B2 | 4/2012 | Szajnowski |
| 8,212,713 B2 | 7/2012 | Aiga et al. |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1 | 9/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |

(56) References Cited

U.S. PATENT DOCUMENTS

| | | |
|---|---|---|
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0166121 A1* | 7/2010 | Kenney, Jr. .......... H04B 1/7093 375/343 |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Nowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |

(56) References Cited

U.S. PATENT DOCUMENTS

| | | |
|---|---|---|
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0033623 A1* | 2/2016 | Holder ............... G01S 7/023 342/93 |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1* | 10/2017 | Eshraghi ............... G01S 7/282 |
| 2017/0309997 A1 | 10/2017 | Alland et al. |
| 2017/0310758 A1 | 10/2017 | Davis et al. |
| 2017/0336495 A1 | 11/2017 | Davis et al. |
| 2018/0175907 A1 | 1/2018 | Marr |
| 2018/0358706 A1* | 12/2018 | Kildal ............... H01Q 9/28 |

FOREIGN PATENT DOCUMENTS

| | | | |
|---|---|---|---|
| EP | 2821808 | 7/2015 | |
| FR | 2751086 | 1/1998 | |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017175190 | 10/2017 | |
| WO | WO2017187330 | 11/2017 | |
| WO | WO-2017187330 A1 * | 11/2017 | ............. G01S 13/87 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

* cited by examiner

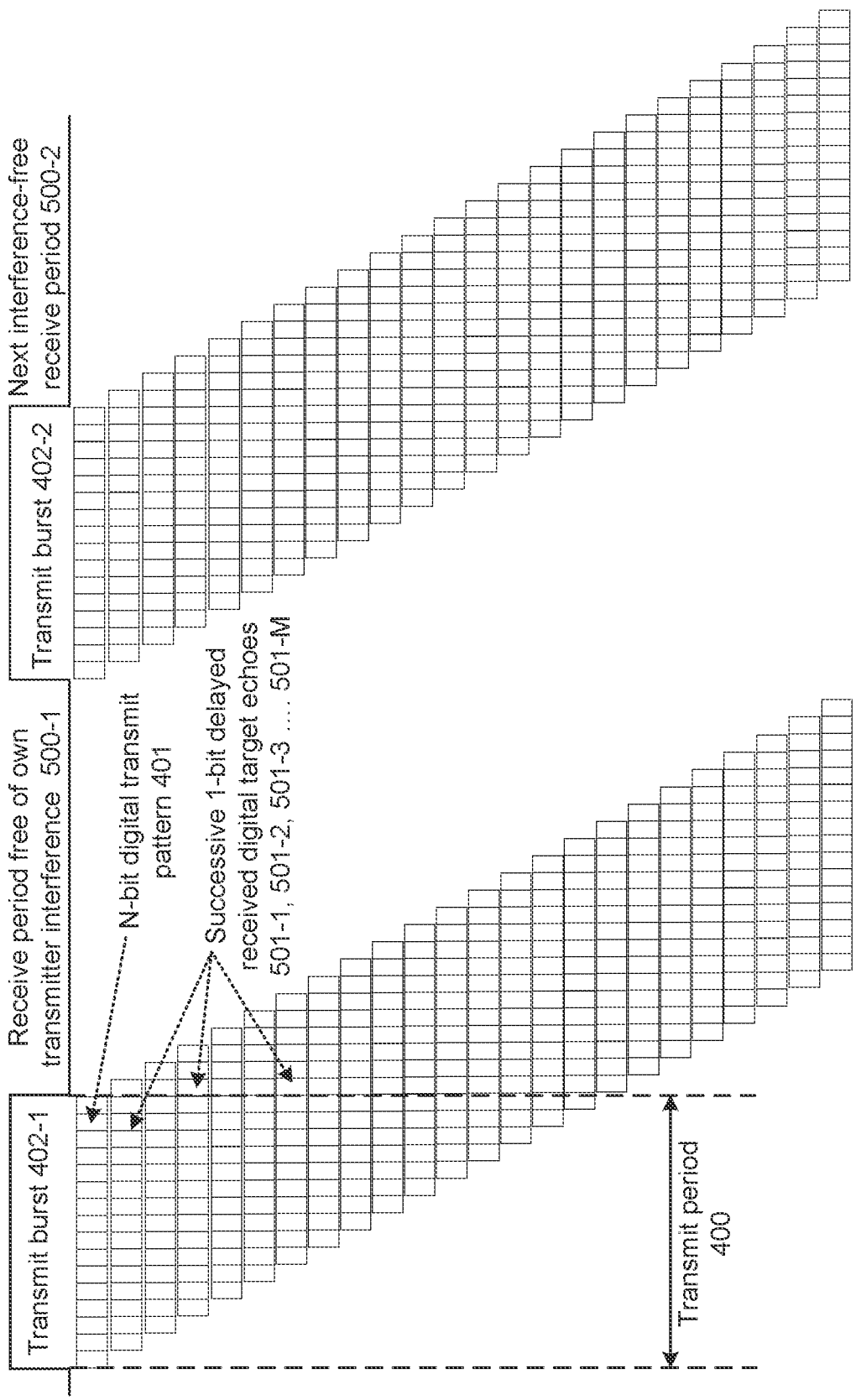
FIG. 4: PULSE-DIGITAL RADAR WAVEFORM FORMAT

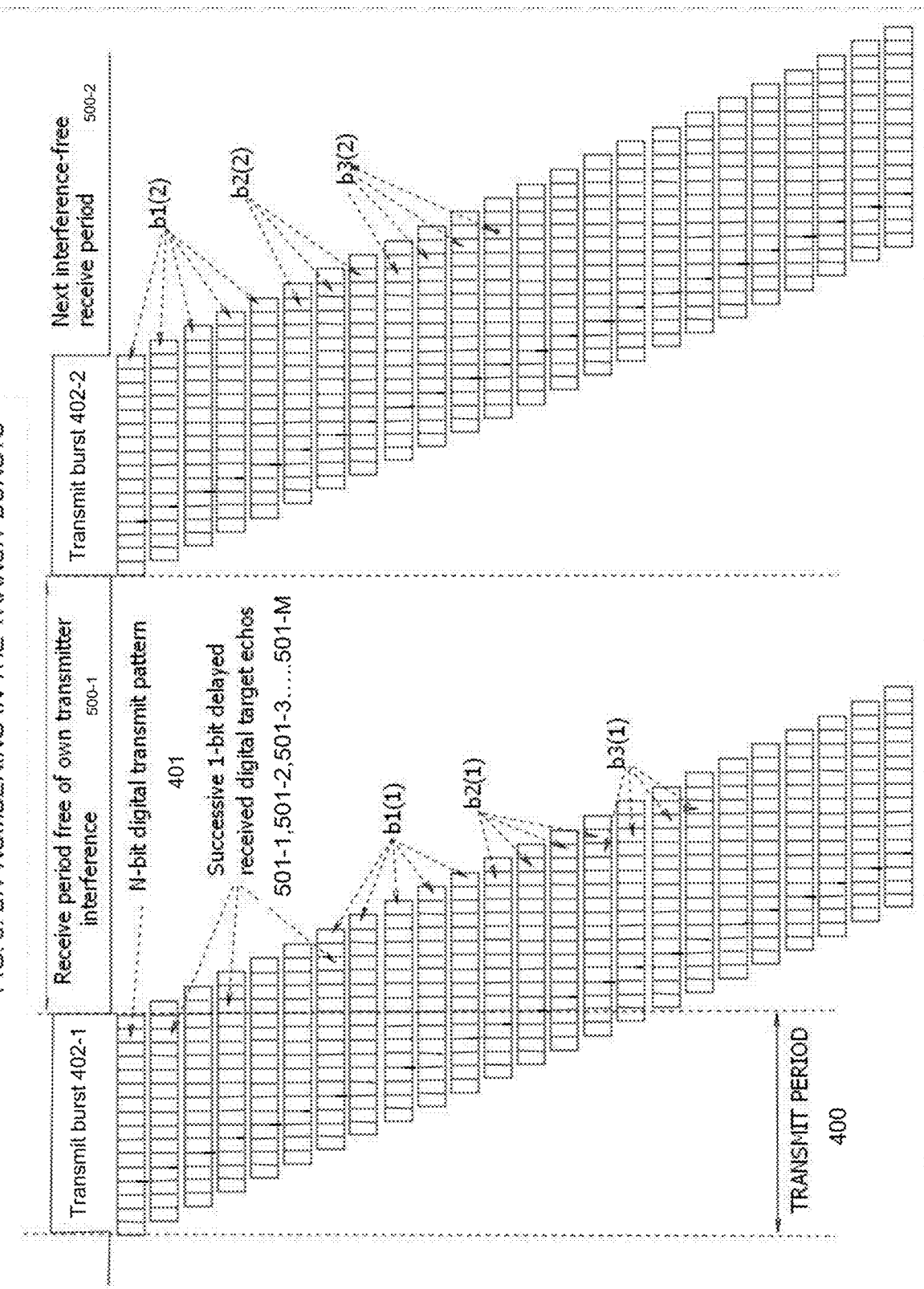
FIG. 5. BIT NUMBERING IN THE TRANSIT BURSTS

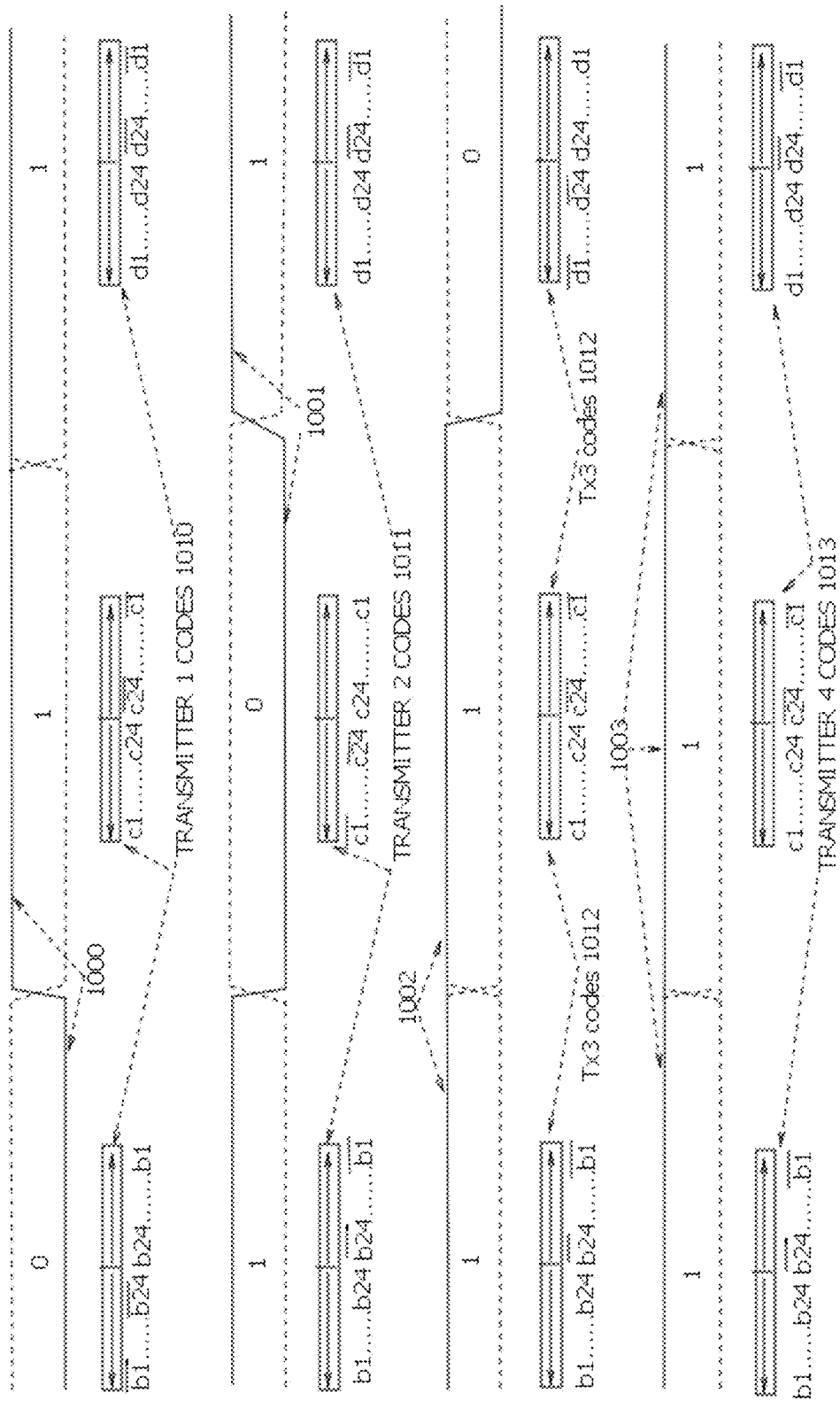
FIG. 6: USE OF PALINDROMIC BARKER-LIKE CODES FOR FOUR TRANSMITTERS

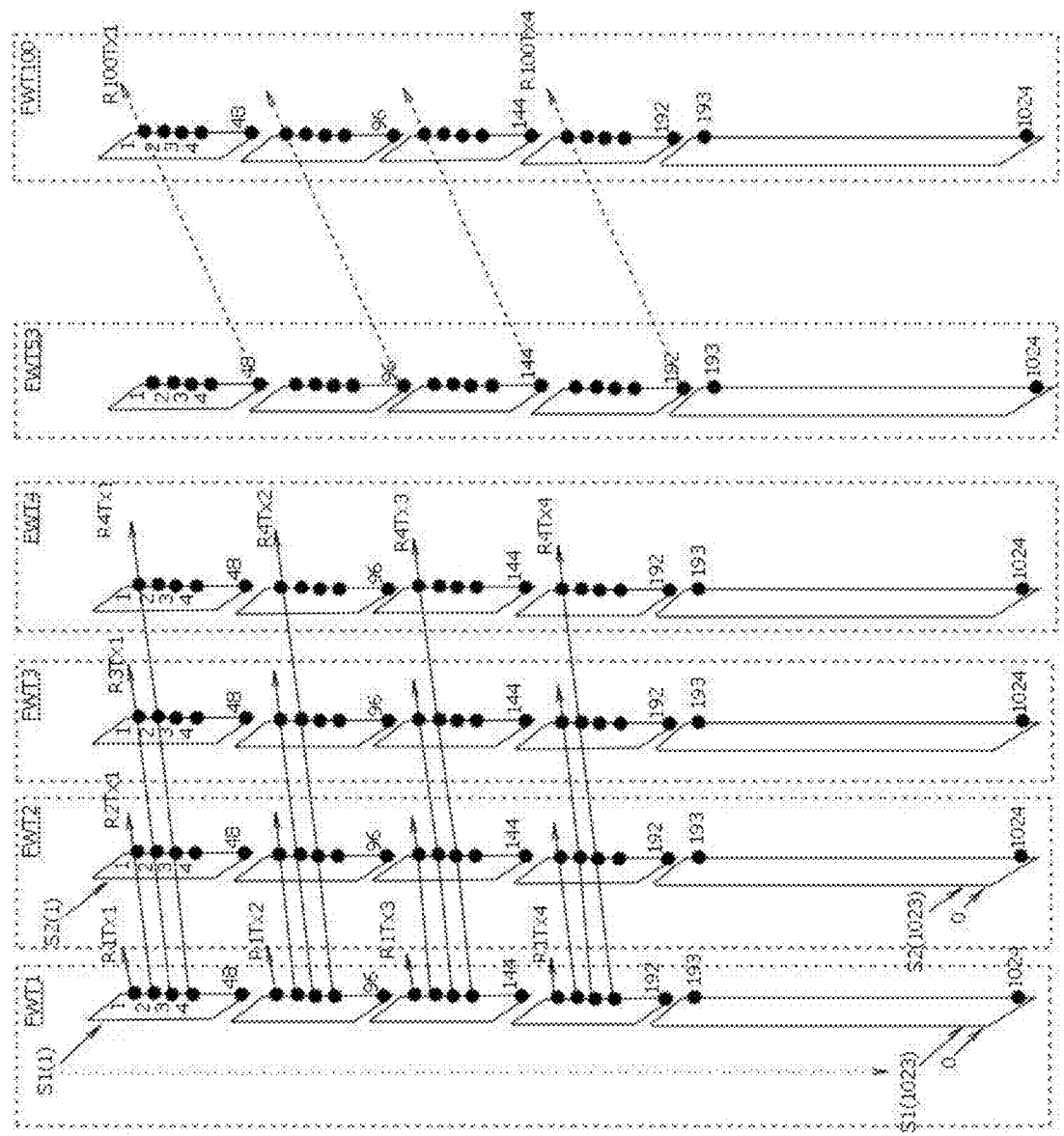
FIG. 7. Pictorial Representation of Accumulation Across FWTs Into Range Bins

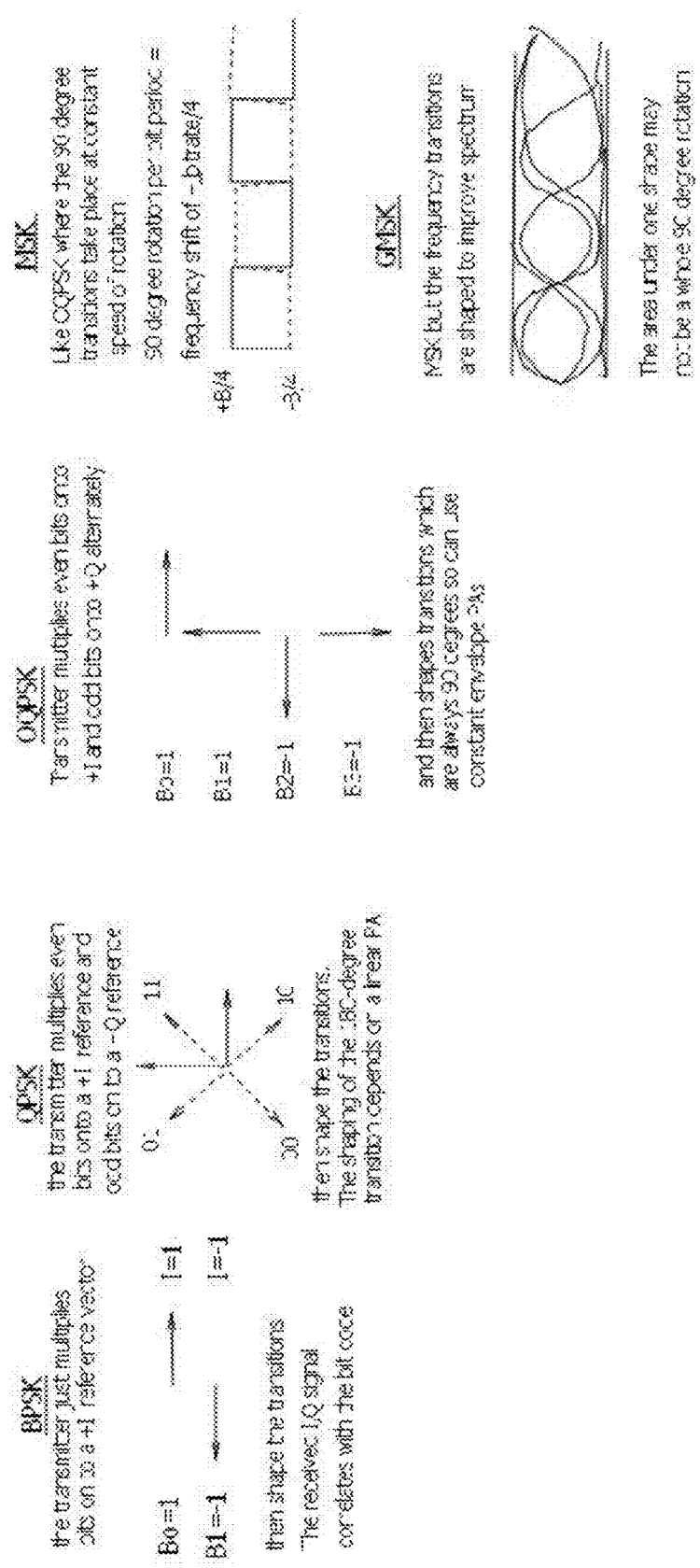
FIG. 8: Characteristics of Different Angle Modulations

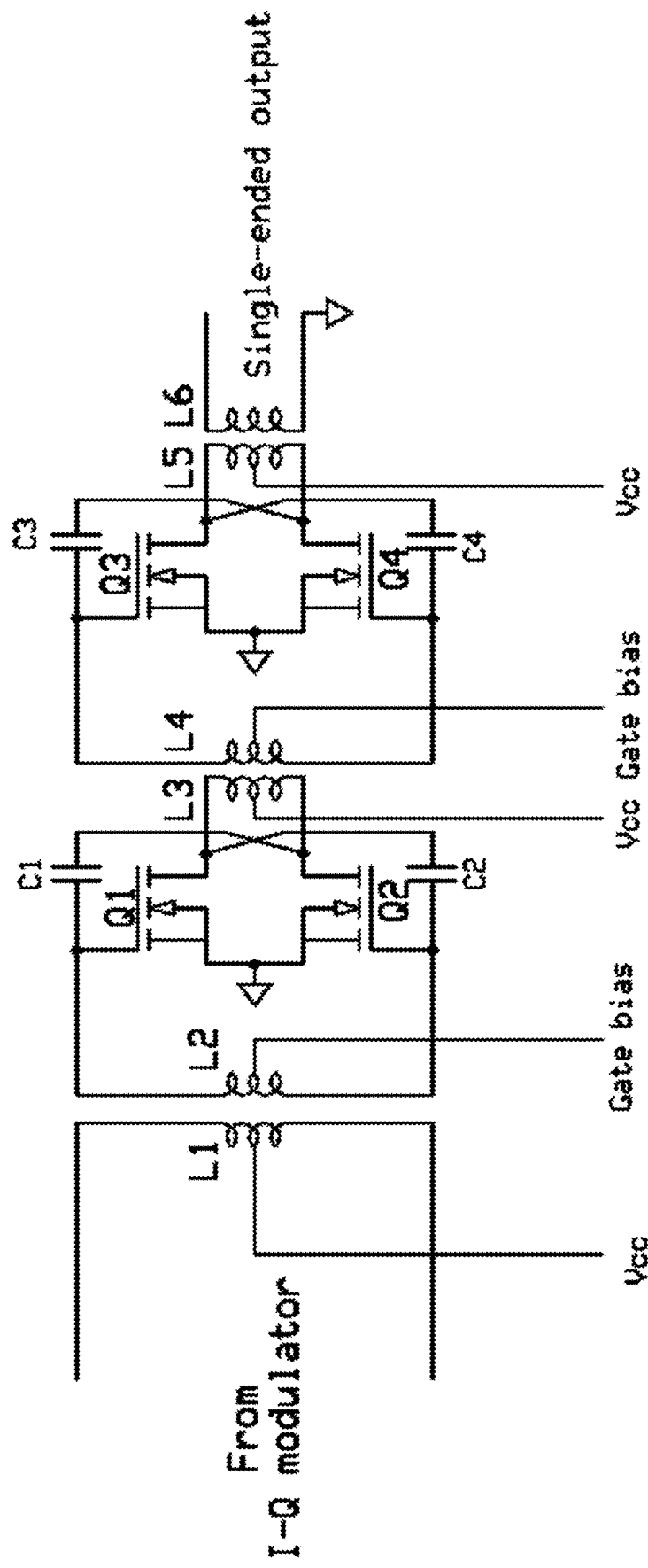
FIG. 9: Two-Stage Neutralized Millimeter-wave, Push-pull Power Amplifier

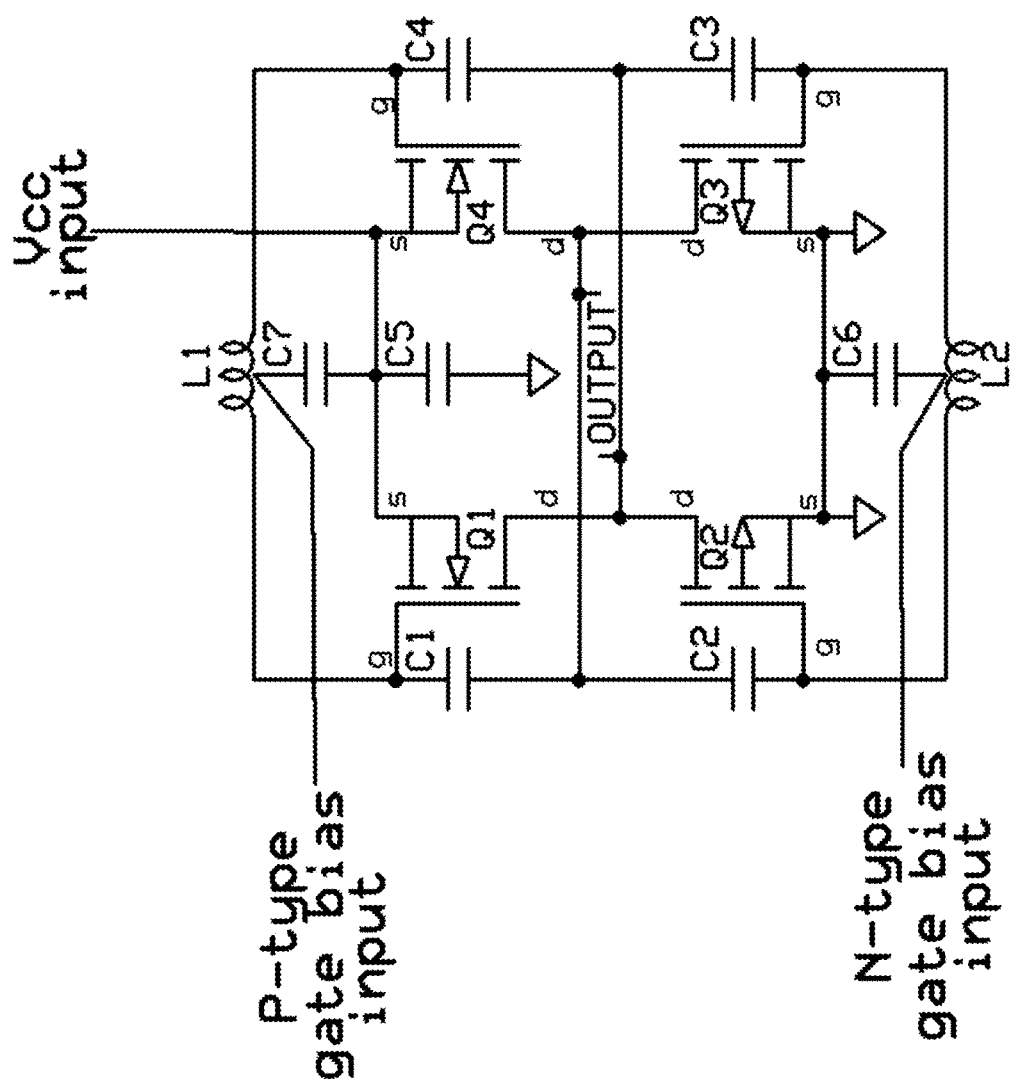
FIG. 10: Complementary, Neutralized Millimeter-wave, CMOS Power Amplifier

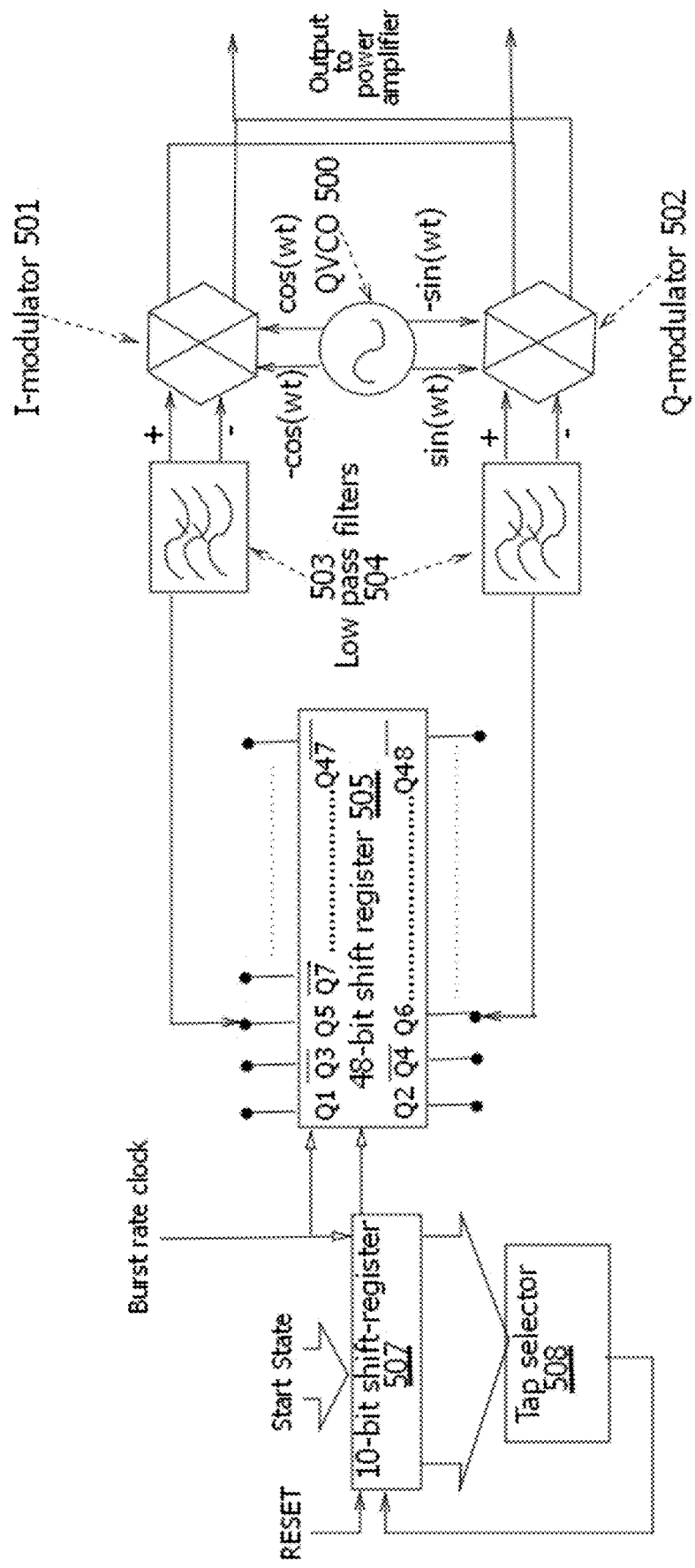
FIG. 11: Quadrature Modulator for Code Transmission

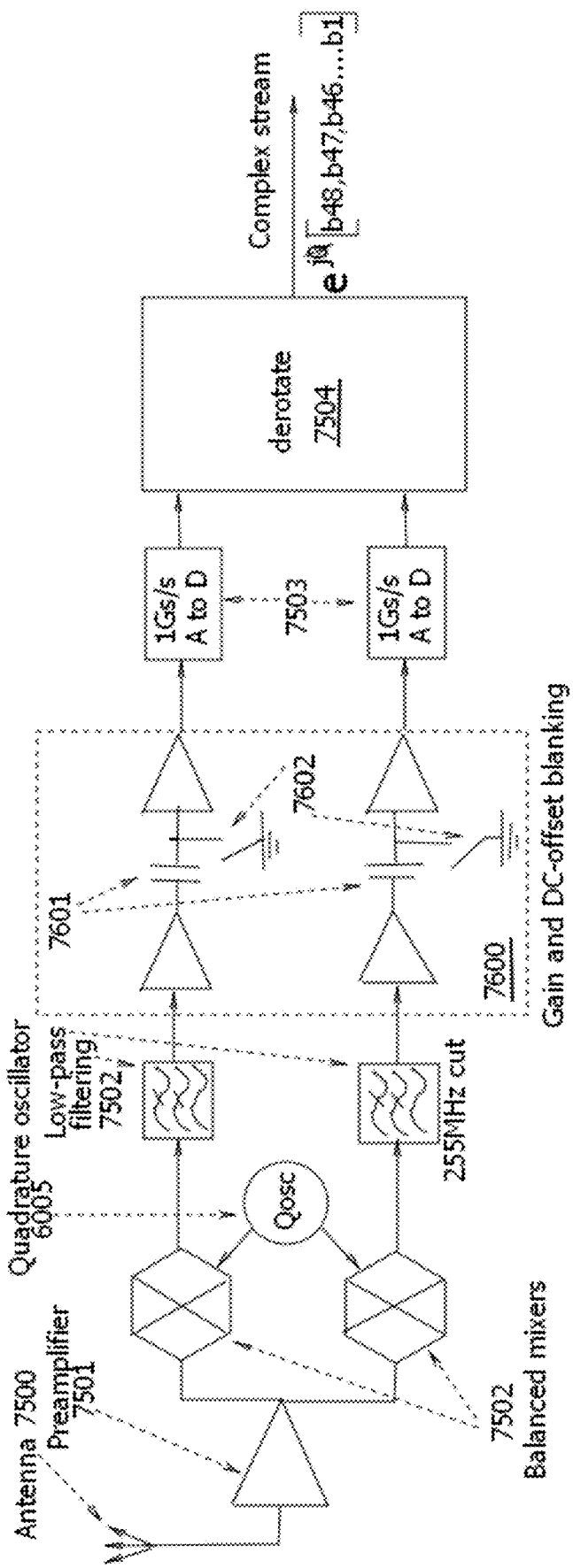
FIG. 12: Direct Conversion Receiver

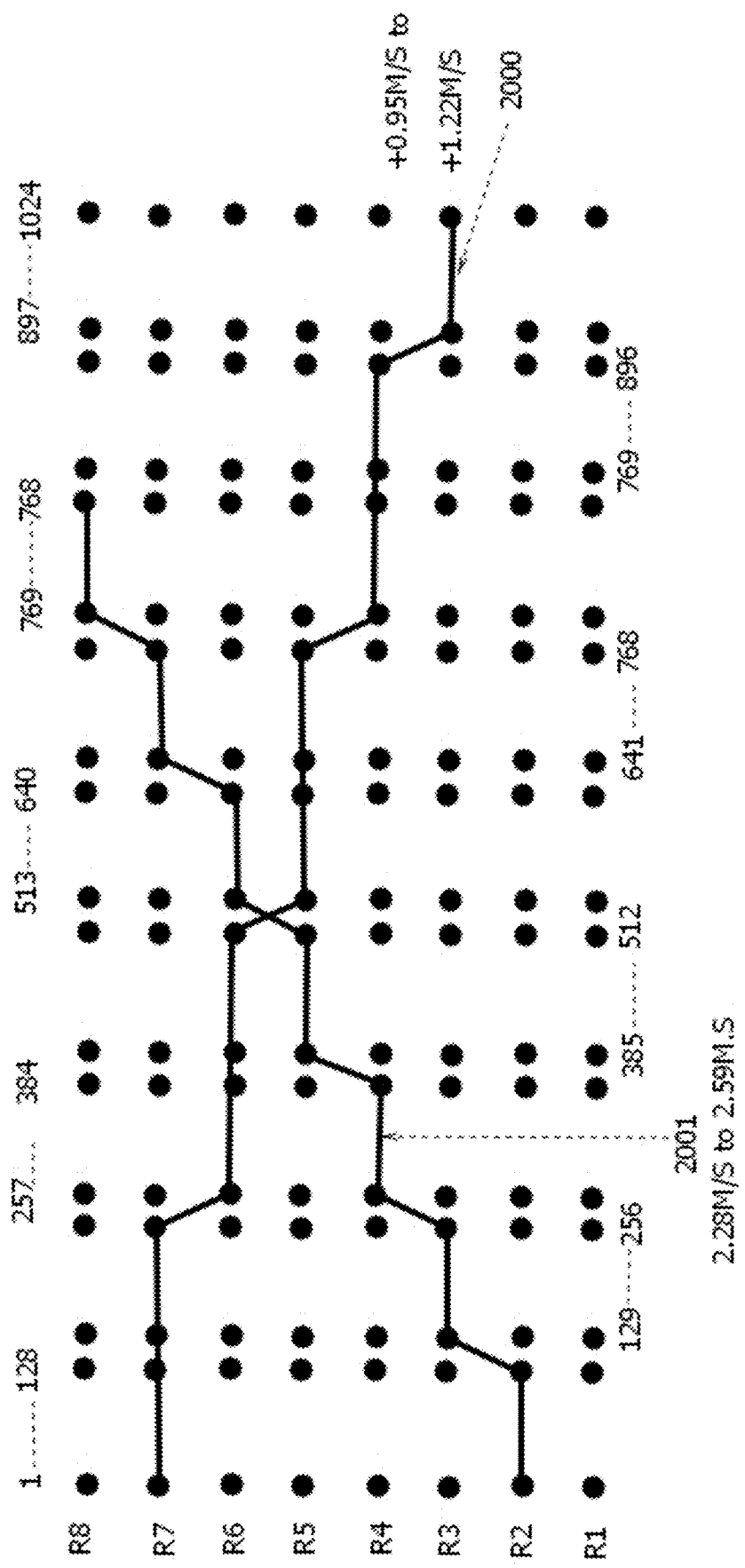
FIG. 13: Lines of Accumulation for High Doppler Shift

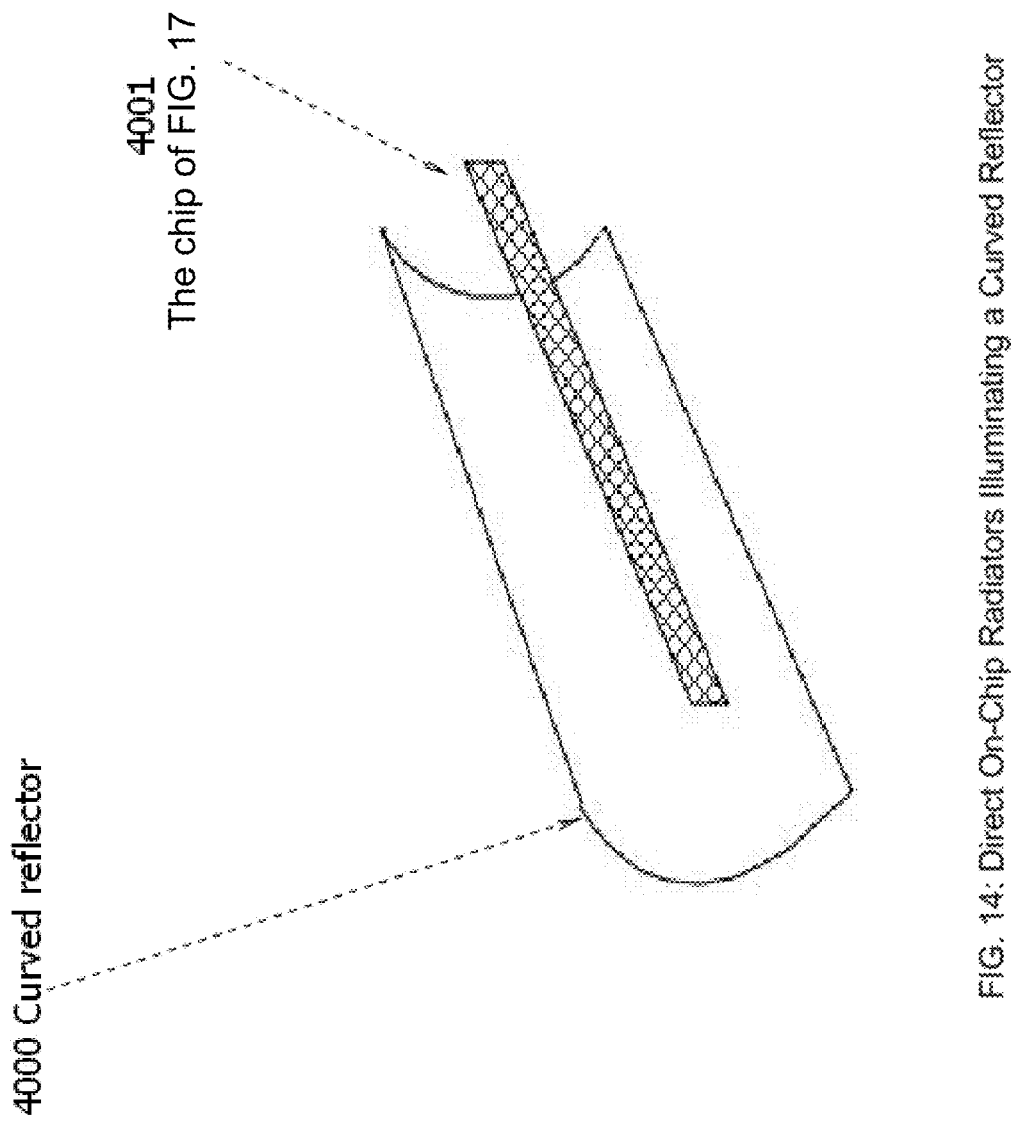
FIG. 14: Direct On-Chip Radiators Illuminating a Curved Reflector

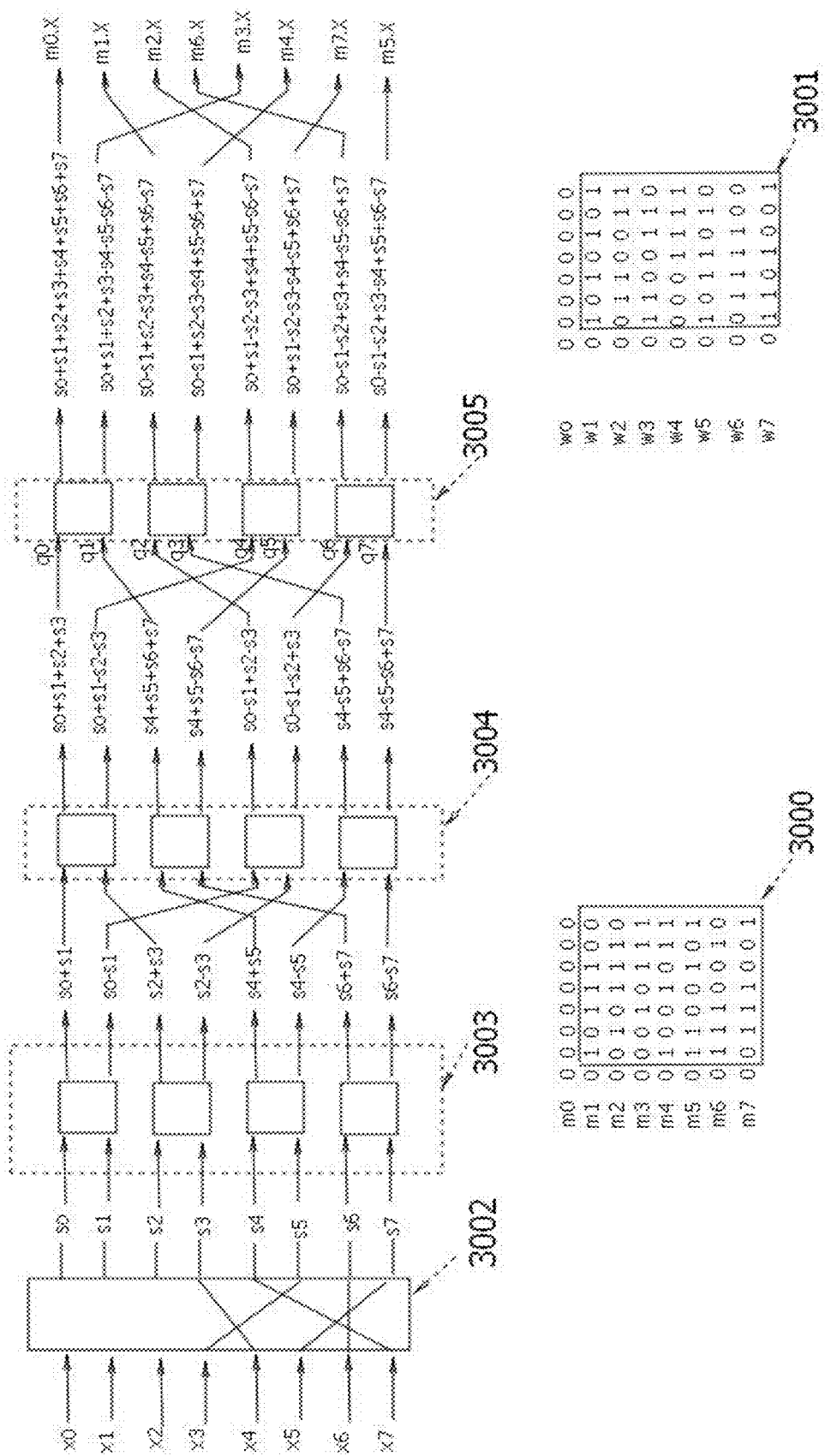
FIG. 15. Adaptive FWT Engine for Performing Multiple, Variable Length Correlations

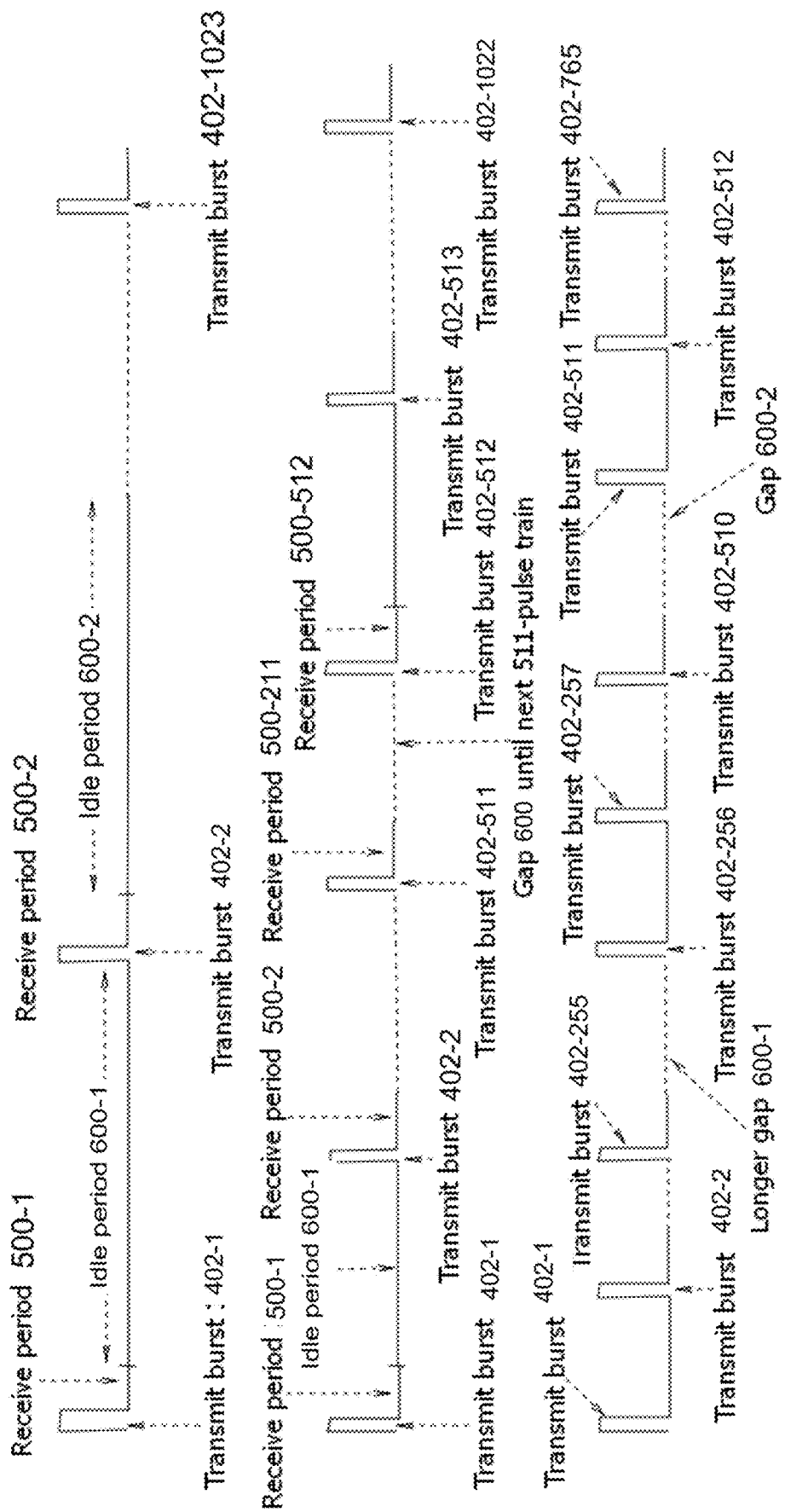
FIG. 16: Illustration of Different Transmit Pulse-Train Formats

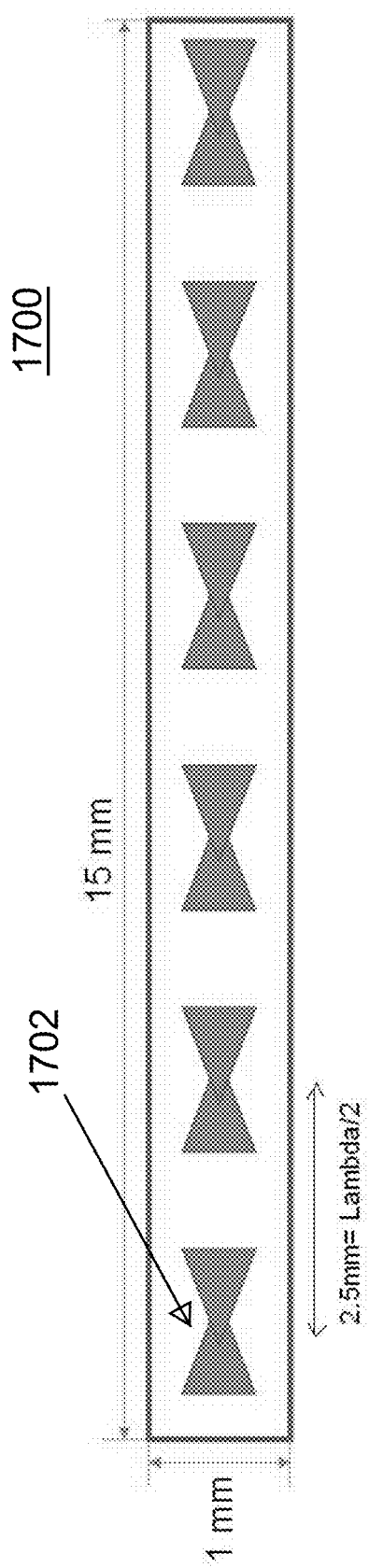
FIG. 17: On-Chip Bow-Tie Dipole Antennas for 60GHz with Half-Wave Spacing

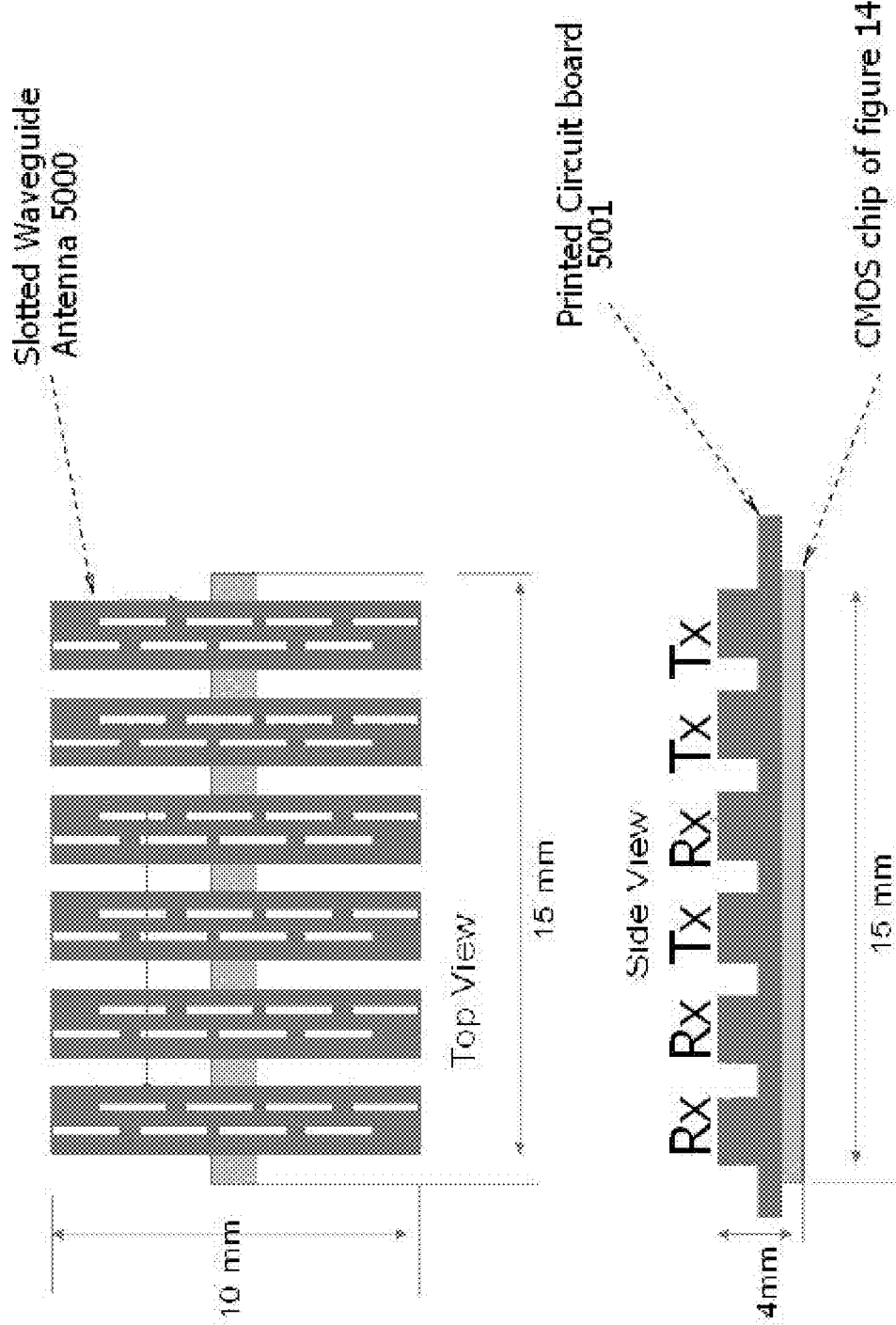
FIG. 18: Illustration of Chip-to-Waveguide Interface with Slotted Waveguide Antennas

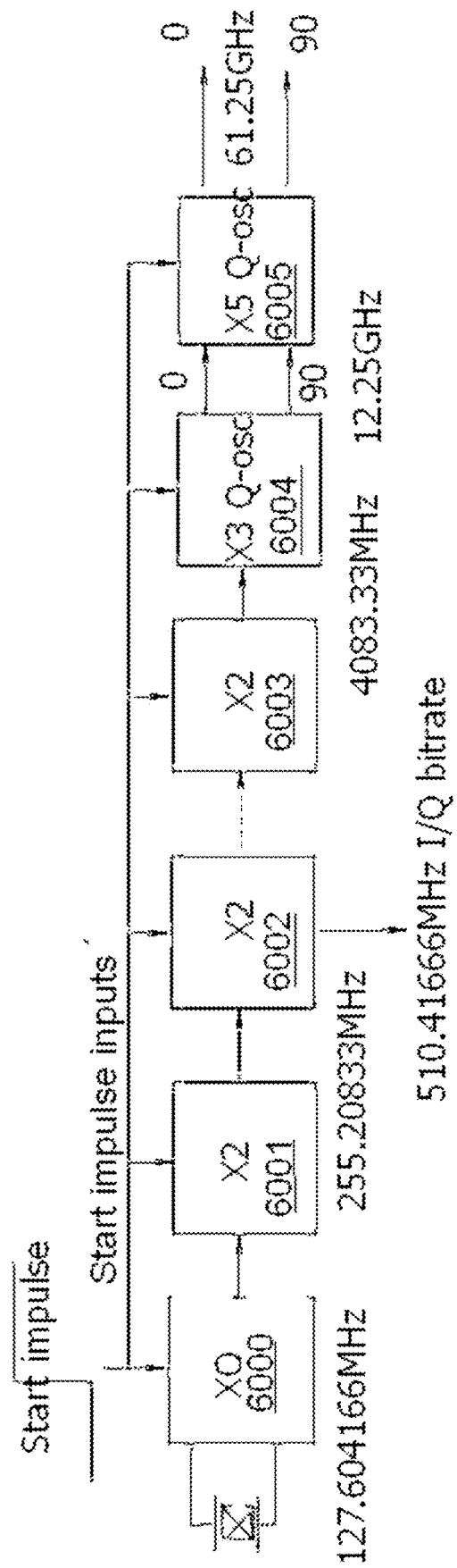
FIG. 19: Local Oscillator Chain Based on Frequency Multipliers

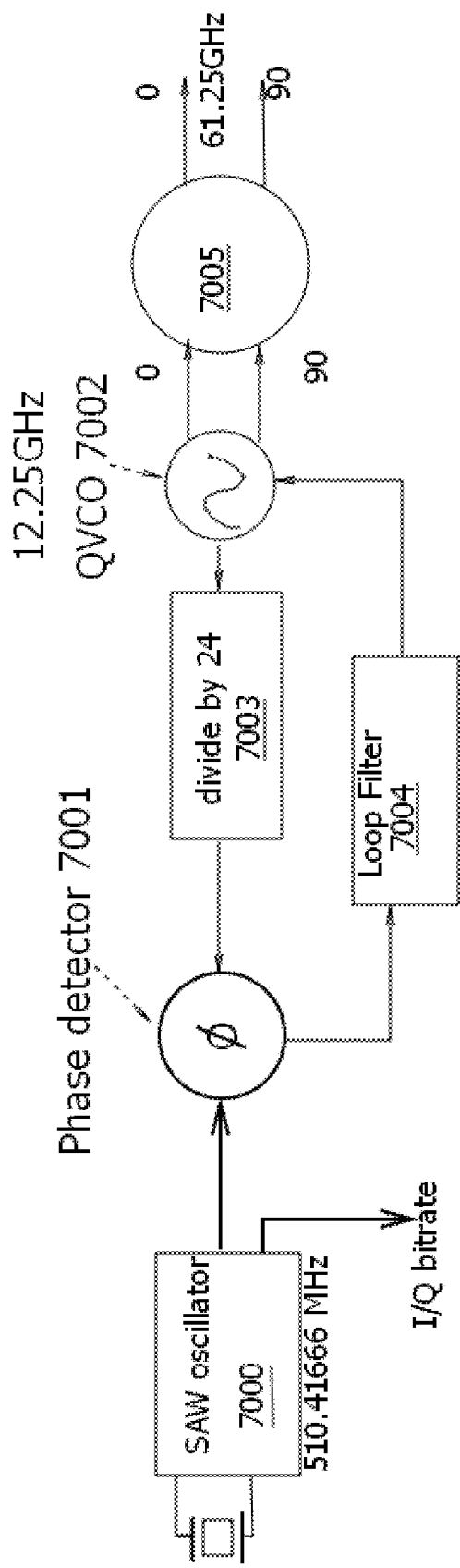
FIG. 20: Local Oscillator Chain Using a Synthesizer Loop

PULSE DIGITAL MIMO RADAR SYSTEM

CROSS REFERENCE TO RELATED APPLICATIONS

The present application claims the filing benefits of U.S. provisional application, Ser. No. 62/757,958, filed Nov. 9, 2018, which is hereby incorporated by reference herein in its entirety.

FIELD OF THE INVENTION

The present invention is directed to radar systems, and in particular to pulsing digital radar systems for vehicles.

BACKGROUND OF THE INVENTION

The use of radar to determine range, velocity, and angle (elevation or azimuth) of objects in an environment is important in a number of applications including automotive radar and gesture detection. Radar systems typically transmit a radio frequency (RF) signal and listen for the reflection of the radio signal from objects in the environment. A radar system estimates the location of objects, also called targets, in the environment by correlating delayed versions of the received radio signal with the transmitted radio signal. A radar system can also estimate the velocity of the target by Doppler processing. A radar system with multiple transmitters and multiple receivers can also determine the angular position of a target. Depending on antenna scanning and/or the number of antenna/receiver channels and their geometry, different angles (e.g., azimuth or elevation) can be determined.

A radar system consists of transmitters and receivers. The transmitters generate a baseband signal, which is upconverted to a radio frequency (RF) signal that propagates according to an antenna pattern. The transmitted signal is reflected off of objects or targets in the environment. The received signal at each receiver is the totality of the reflected signal from all targets in the environment. The receiver down converts the received signal to baseband and compares the baseband received signal to the baseband signal at one or more transmitters. This is used to determine the range, velocity, and angle of targets in the environment.

SUMMARY OF THE INVENTION

Embodiments of the present invention provide methods and an apparatus to improve the performance of a radar system. An exemplary chip-implementation of a millimeter wave MIMO radar comprises transmitters for transmitting short bursts of digitally modulated radar carrier signals and receivers for receiving delayed echoes of those signals. Various signal formats, defined by the number of bits per transmit burst, the transmit burst duration, the receive period duration, the bitrate, the number of range bins, and the number of bursts per scan, facilitate the choice of modulating bit patterns such that when correlating for target echoes over an entire scan, the correlation codes for different ranges and different transmitters are mutually orthogonal or nearly so. In the event of imperfect orthogonality, simple orthogonalization schemes are revealed, such as the subtraction of strong already-detected target signals for better detection of weaker signals, or for better detection of moving targets that are rendered non-orthogonal by their Doppler shift.

In an aspect of the present invention, for a very low-power battery-operated indoor radar chip, as might be of use as a security alarm, the processing may be by means of a "Fast Walsh Transform" engine that is extremely efficient, and thus also power efficient.

In an aspect of the present invention, a pulse-digital, multiple input, multiple output (MIMO) radar on an integrated circuit chip includes a transmitter, a receiver, and a digital processor. The transmitter includes digital modulation capability and transmits bursts of a radar frequency signal. Each burst signal is modulated by a predetermined number of bits chosen from a digital code set. The receiver can receive the digitally modulated transmitter signals reflected from distant objects lying at various distances and having various commensurate round-trip echo delays. The digital processor is for correlating the signals received by the receiver with the digital code sequence (used to modulation the transmitted signal burst) to determine the round-trip echo delays and thus the various distances. The digital code sequence is chosen such that correlating for different round trip echo delays and/or correlating for echoes of different transmitter signals involves correlating with subsets of the digital code set that exhibit significantly lower cross-correlation than random codes.

These and other objects, advantages, purposes and features of the present invention will become apparent upon review of the following specification in conjunction with the drawings.

BRIEF DESCRIPTION OF THE DRAWINGS

FIG. 4 illustrates an exemplary waveform format for a burst-digital radar in accordance with the present invention;

FIG. 5 illustrates an exemplary bit numbering in the transmit bursts in accordance with the present invention;

FIG. 6 illustrates the use of skew-palindromic Barker-like codes for transmitters in accordance with the present invention;

FIG. 7 illustrates the addition of Fast Walsh Transform (FWT) correlation results to corresponding range bins in accordance with the present invention;

FIG. 8 illustrates the characteristics of different digital modulations in accordance with the present invention;

FIG. 9 illustrates an exemplary push-pull transmitter power amplifier having on-chip tuning and matching in accordance with the present invention;

FIG. 10 illustrates an exemplary complementary, neutralized, millimeter-wave, H-bridge power amplifier in accordance with the present invention;

FIG. 11 illustrates an exemplary quadrature modulator for digital code transmission in accordance with the present invention;

FIG. 12 illustrates an exemplary direct conversion receiver in accordance with the present invention;

FIG. 13 illustrates exemplary "lines of accumulation" for high Doppler shift in accordance with the present invention;

FIG. 14 illustrates exemplary on-chip antennas directly illuminating a curved reflector in accordance with the present invention;

FIG. 15 illustrates an adaptive Fast Walsh Transform (FWT) engine for performing multiple, variable length correlations in accordance with the present invention;

FIG. 16 illustrates different transmit pulse-train formats in accordance with the present invention;

FIG. 17 illustrates the arrangement of a linear array of antennas on a long, thin chip in accordance with the present invention;

FIG. 18 illustrates an exemplary chip-to-waveguide interface for slotted waveguide array antennas in accordance with the present invention;

FIG. 19 illustrates an exemplary local-oscillator multiplier chain in accordance with the present invention; and FIG. 20 illustrates an implementation of a local oscillator using a synthesizer loop in accordance with the present invention.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention provide an exemplary chip-implementation of a millimeter wave MIMO radar that is configured to transmit short bursts of digitally modulated radar carrier signals and receive delayed echoes of those signals. Various signal formats, defined by the number of bits per transmit burst, the transmit burst duration, the receive period duration, the bitrate, the number of range bins, and the number of bursts per scan, facilitate the choice of modulating bit patterns such that when correlating for target echoes over an entire scan, the correlation codes for different ranges and different transmitters are mutually orthogonal or nearly so. In the event of imperfect orthogonality, simple orthogonalization schemes may be used, such as the subtraction of strong already-detected target signals for better detection of weaker signals, or for the detection of moving targets that are rendered non-orthogonal by their Doppler shift.

Figure 1:
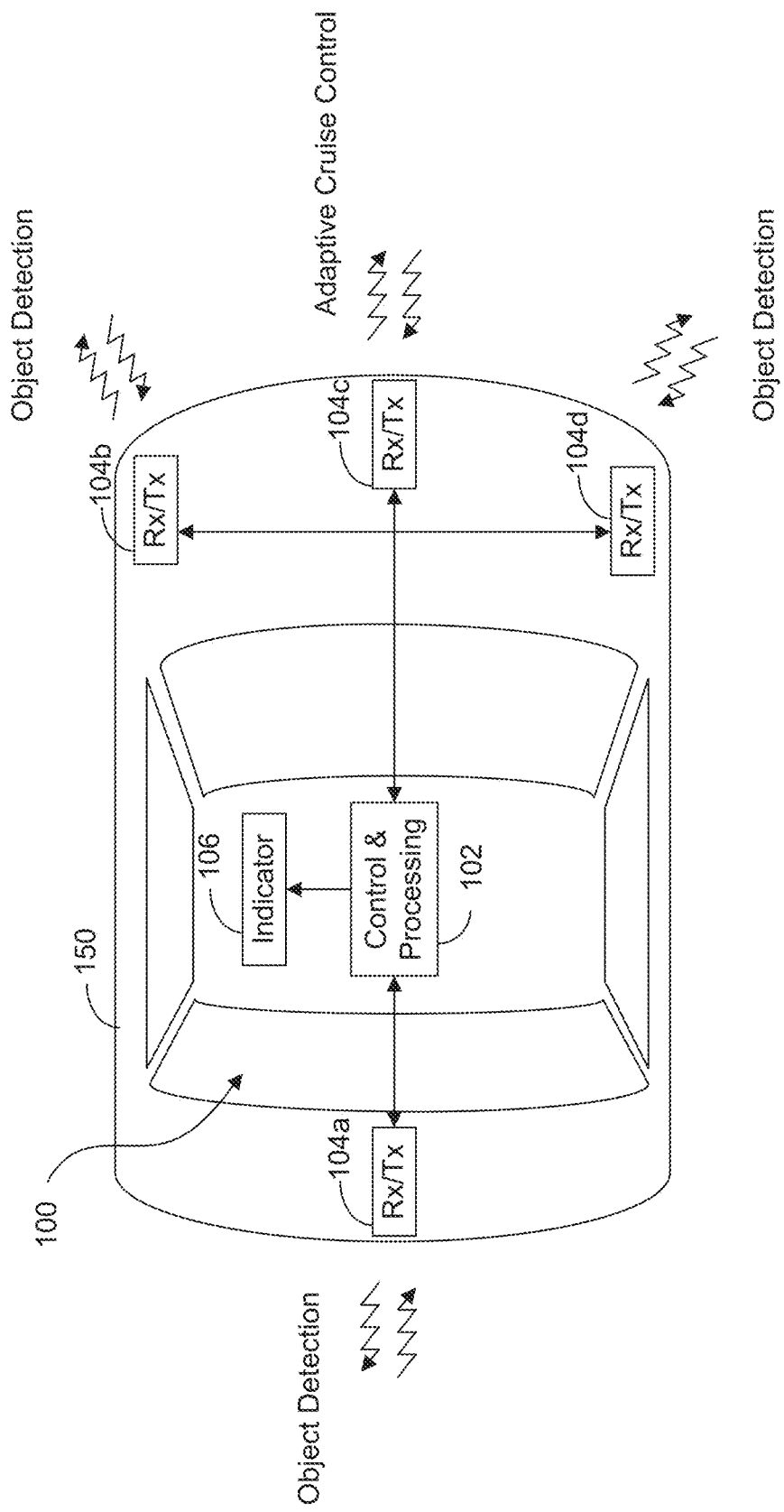
FIG. 1 is a plan view of an automobile equipped with a radar system in accordance with the present invention.

FIG. 1 illustrates an exemplary radar system 100 configured for use in a vehicle 150. In an aspect of the present invention, a vehicle 150 may be an automobile, truck, or bus, etc. The radar system 100 may utilize multiple radar systems (e.g., 104a-104d) embedded in the vehicle 150 (see FIG. 1). Each of these radar systems may employ multiple transmitters, receivers, and antennas (see FIG. 3). These signals are reflected from objects (also known as targets) in the environment and received by one or more receivers of the radar system. A transmitter-receiver pair is called a virtual radar (or sometimes a virtual receiver). As illustrated in FIG. 1, the radar system 100 may comprise one or more transmitters and one or more receivers (104a-104d) for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and then analyzes position information received from the receivers 104a-104d and forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

Figure 2A:
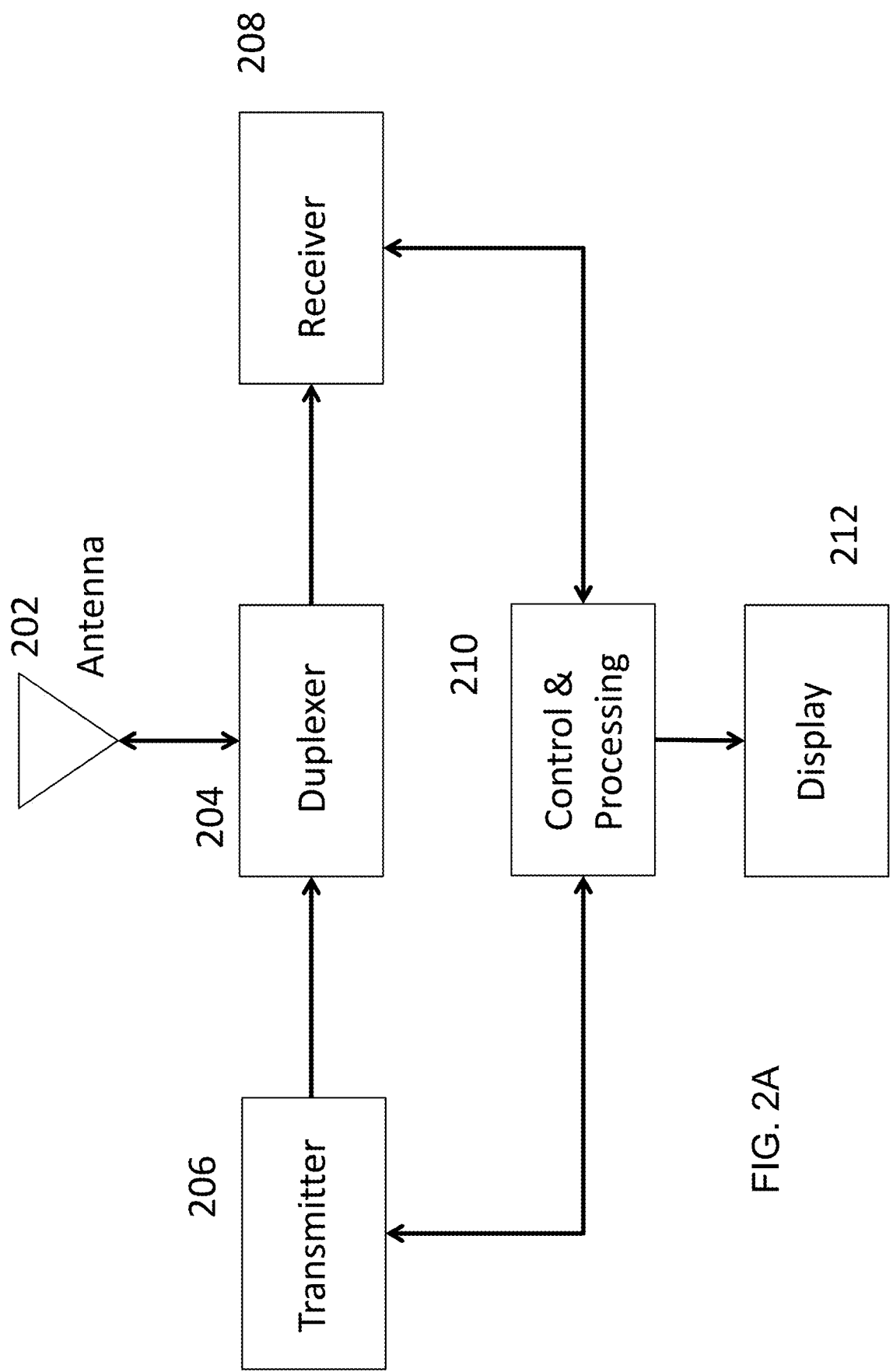
FIGS. 2A and 2B are block diagrams of radar systems in accordance with the present invention.
Figure 2B:
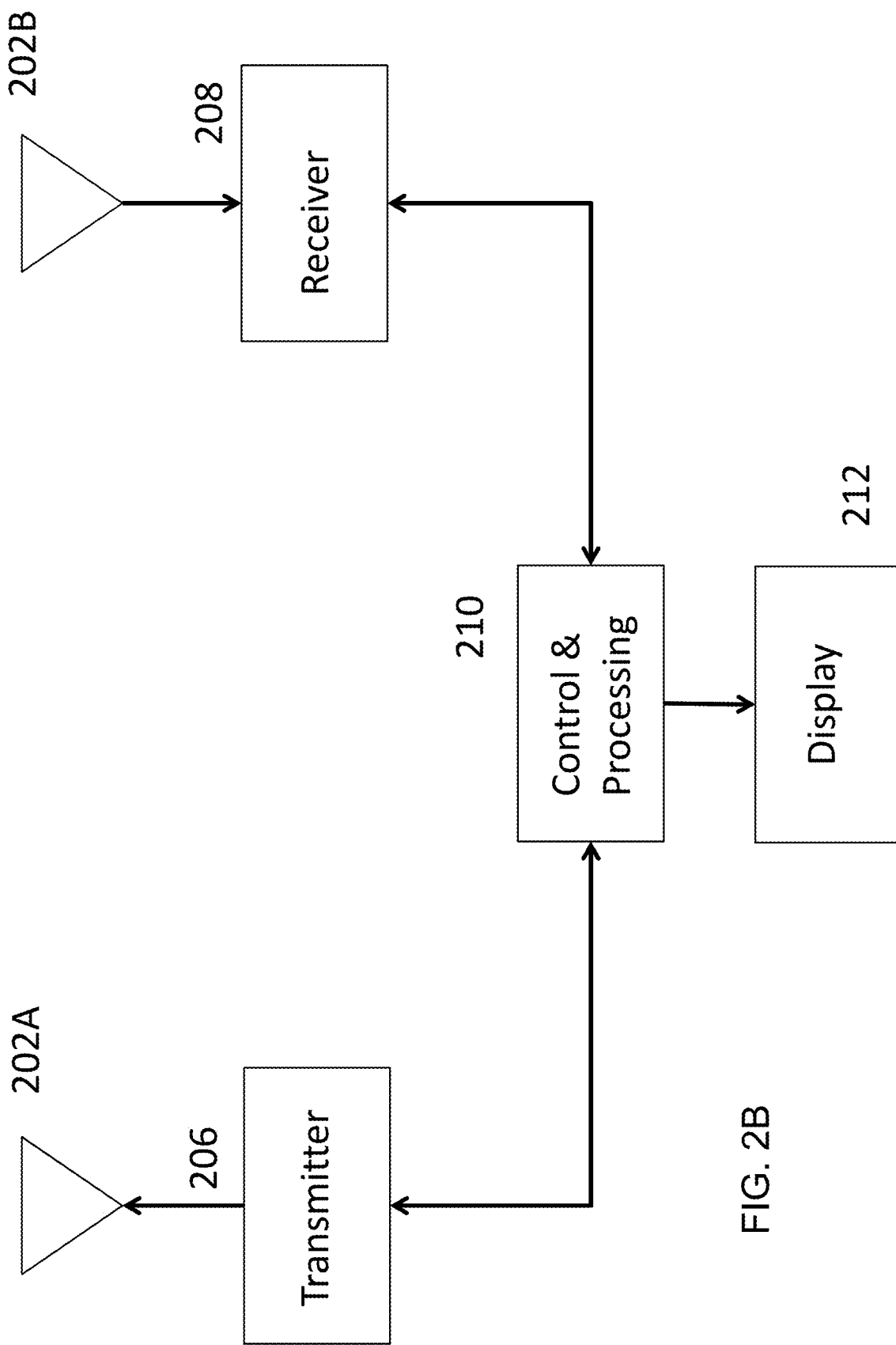

There are several ways to implement a radar system. One way, illustrated in FIG. 2A, uses a single antenna 202 for transmitting and receiving. The antenna 202 is connected to a duplexer 204 that routes the appropriate signal from the antenna 202 to a receiver 208 or routes the signal from a transmitter 206 to the antenna 202. A control processor 210 controls the operation of the transmitter 206 and the receiver 208 and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display 212 to visualize the location of objects in the environment.

Figure 3:
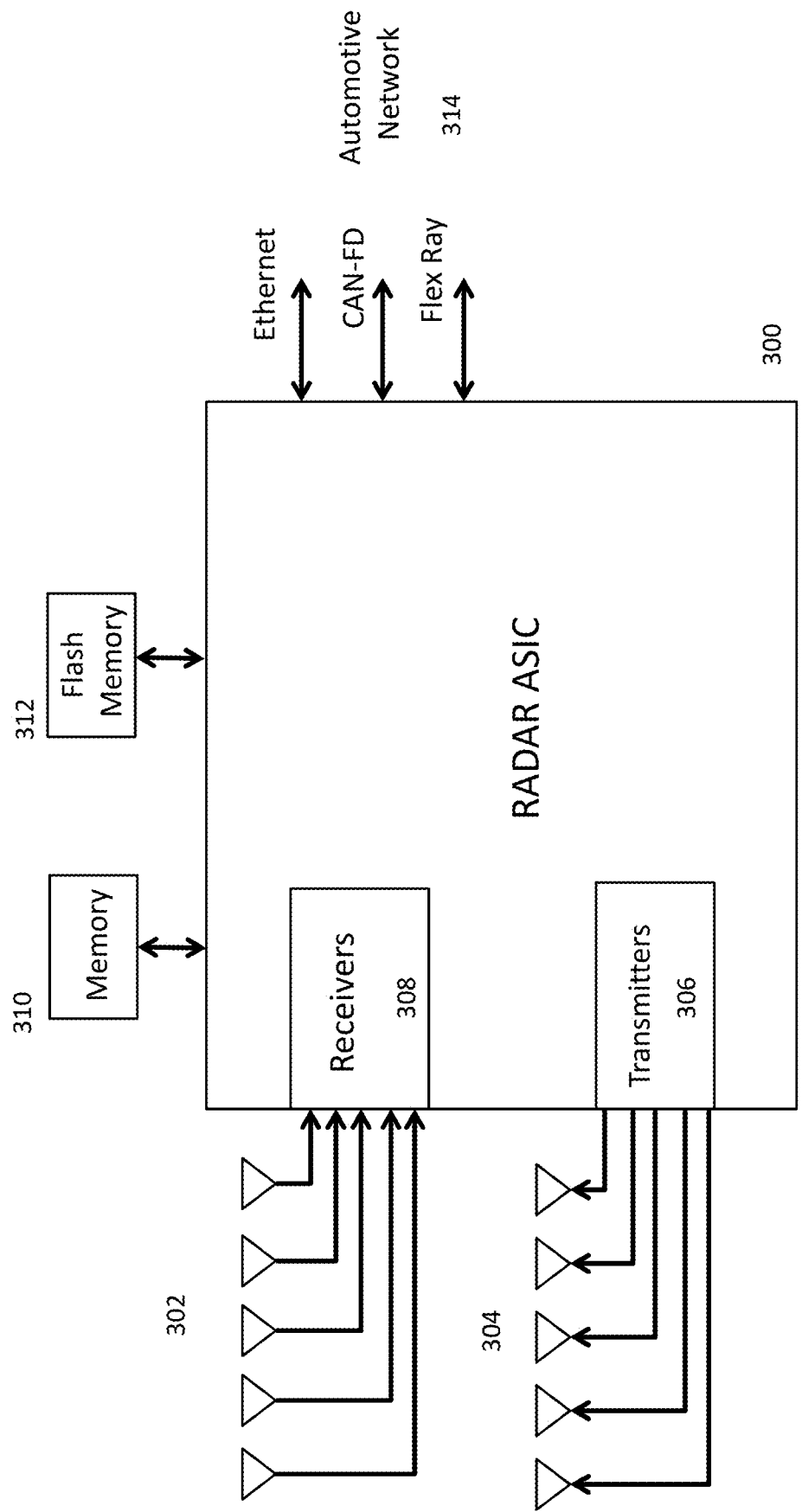
FIG. 3 is a block diagram illustrating a radar system with a plurality of receivers and a plurality of transmitters in accordance with the present invention.

A radar system with multiple antennas, multiple transmitters, and multiple receivers is shown in FIG. 3. Using multiple antennas 302, 304 allows an exemplary radar system 300 to determine the angle (azimuth, elevation, or both) of targets in the environment. Depending on the geometry of the antenna system, different angles (e.g., azimuth or elevation) can be determined.

The radar system 300 may be connected to a network via an Ethernet connection or other types of network connections 314, such as, for example, CAN-FD and FlexRay. The radar system 300 may also have memory (310, 312) to store software used for processing the signals in order to determine range, velocity, and location of objects. Memory 310, 312 may also be used to store information about targets in the environment. There may also be processing capability contained in the ASIC 208 apart from the transmitters 203 and receivers 204.

The description herein includes an exemplary radar system in which there are $N_T$ transmitters and $N_R$ receivers for $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment. Each receiver can attempt to determine the range and Doppler of objects by correlating with delayed replicas of the signal from each of the transmitters. The physical receivers may then be "divided" into three separate virtual receivers, each virtual receiver correlating with delay replicas of one of the transmitted signals.

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is in the modulation of the signal being transmitted. A first type of continuous wave radar signal is known as a frequency modulated continuous wave (FMCW) radar signal. In an FMCW radar system, the transmitted signal is a continuous sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a continuous sinusoidal signal in which the phase of the sinusoidal signal varies. Typically, the phase during a given time period (called a chip period or chip duration) is one of a finite number of possible phases. A spreading code consisting of a sequence of chips, (e.g., +1, +1, −1, +1, −1 . . . ) is mapped (e.g., +1→0, −1→π) into a sequence of phases (e.g., 0, 0, π, 0, π . . . ) that is used to modulate a carrier signal to generate the radio frequency (RF) signal. The spreading code could be a periodic sequence or could be a pseudo-random sequence with a very large period so it appears to be a nearly random sequence. The spreading code could be a binary code (e.g., +1 or −1). The resulting signal has a bandwidth that is proportional to the rate at which the phases change, called the chip rate $R_c$, which is the inverse of the chip duration $T_c=1/R_c$. By comparing the return signal to the transmitted signal, the receiver can determine the range and the velocity of reflected objects.

In some radar systems, the signal (e.g. a PMCW signal) is transmitted over a short time period (e.g. 1 microsecond) and then turned off for a similar time period. The receiver is only turned on during the time period where the transmitter is turned off. In this approach, reflections of the transmitted signal from very close targets will not be completely available because the receiver is not active during a large fraction of the time when the reflected signals are being received. This is called pulse mode.

The radar sensing system of the present invention may utilize aspects of the radar systems described in U.S. Pat. Nos. 10,261,179; 9,971,020; 9,954,955; 9,945,935; 9,869, 762; 9,846,228; 9,806,914; 9,791,564; 9,791,551; 9,772, 397; 9,753,121; 9,599,702; 9,575,160, and/or 9,689,967, and/or U.S. Publication Nos. 2018/0231656, 2018/0231652, 2018/0231636, and 2017/0309997, and/or U.S. provisional applications, Ser. No. 62/486,732, filed Apr. 18, 2017, Ser. No. 62/528,789, filed Jul. 5, 2017, Ser. No. 62/573,880, filed Oct. 18, 2017, Ser. No. 62/598,563, filed Dec. 14, 2017, Ser. No. 62/623,092, filed Jan. 29, 2018, and/or Ser. No. 62/659, 204, filed Apr. 18, 2018, which are all hereby incorporated by reference herein in their entireties.

Digital frequency modulated continuous wave (FMCW) and phase modulated continuous wave (PMCW) are techniques in which a carrier signal is frequency or phase modulated, respectively, with digital codes using, for example, GMSK. Digital FMCW radar lends itself to be constructed in a MIMO variant in which multiple transmitters transmitting multiple codes are received by multiple receivers that decode all codes. The advantage of the MIMO digital FMCW radar is that the angular resolution is that of a virtual antenna array having an equivalent number of elements equal to the product of the number of transmitters and the number of receivers. Digital FMCW MIMO radar techniques are described in U.S. Pat. Nos. 9,989,627; 9,945, 935; 9,846,228; and 9,791,551, which are all hereby incorporated by reference herein in their entireties.

In a digital FMCW case, the receiver operates during the transmit time and requires sophisticated means to null-out own transmitter interference. Self-interference or spillover cancellation increases in complexity when the number of MIMO transmitters and receivers increases. Therefore, methods are sought to reduce both complexity and power consumption, and this disclosure thus describes advantageous variants, referred to here as pulse-digital MIMO radars, which are useful in achieving the goals of reduced complexity and reduced power consumption.

A pulse-digital MIMO radar system, with parameters configured for short range, indoor surveillance will first be described. FIG. 4 illustrates the operation of such a short-range Pulse-Digital MIMO radar. In transmit period 400, at least one transmitter transmits a signal burst (402-1) that is digitally modulated with an N-bit pattern (401). The modulation would typically be BPSK, OQPSK, GMSK or handcrafted variations thereof as described in the above-incorporated patents. The receive period (500-1) for receiving echoes of the transmit burst (402-1) reflected from target objects begins as soon as the transmit burst (402-1) has ended. The nearest reflecting object may return an echo with only a 1-bit delay. Successive echoes may be received with successive delays of 1 bit (501-1), 2 bits (501-2), 3 bits, etc., all the way out to the maximum delay of the longest-range target. For a short-range radar for detecting objects out to say 50 feet, and operating at a modulation bit rate of 1 GB's, a 1-bit delayed echo would be received from an object approximately 6" away and a maximum range object at 50' would return an echo with approximately 100 nS delay, or 100 bits. The N-bit length of the transmit burst may be chosen to fill the maximum go-return path delay of 100 nS or may be shorter to reduce the transmitter duty factor to save power. If it is longer, since it is not desired to operate the receiver while the transmitter is operating, early echoes may be received before the transmitter has stopped, wasting more energy than if the transmit burst had been shorter. On the other hand, if the transmit burst is too short, insufficient echo energy may be received from weak distant targets.

It can be seen from FIG. 4 that echoes from different distances overlap and that the maximum number of partially overlapping echoes is overlapping shifts of themselves. It is described below how to find Barker-like codes for lengths greater than 13 bits, the longest length of known perfect Barker codes. When Barker codes are used for exemplary 48-bit transmit bursts, the same Barker code or sequence of Barker codes may be transmitted by each transmitter, with transmitters being distinguished by superimposing a sign-inversion on each whole transmit burst. Sign inversion or no sign inversion being selected from one burst to the next according to the bits of one of a set of burst-rate, mutually orthogonal (or nearly so) bit patterns unique to each transmitter. Inverting the bits in a transmit burst from one transmitter relative to another negates the cross correlation between different transmitters but does not alter the auto-correlation, thus enabling some degree of independent design of the auto- and cross-correlation properties.

It will be seen that one good choice for the number of transmit bursts that constitute a scan, and which are jointly processed, corresponds to the length $M=2^L-1$, of a maximum-length sequence or M-sequence. For example, with L=10, the length is 1023, close to the exemplary 1000 postulated above. In some implementations, Walsh-Hadamard codes can be used and the scan is then of length $M=2^L$ e.g. 1024. Use of Walsh-Hadamard codes will be described in more detail in connection with the long-range, driver-assistance radar variant of the invention.

Barker codes have the property that different, partially overlapping Barker codes have minimum correlation of +/−1 for any shift, the difference between the numbers of like and unlike bits being only one. However, no such perfect Barker codes longer than 13 bits have been discovered. Barker-like codes have been discovered in DNA sequences to mark the start and stop of the base sequences constituting genes—so called Start and Stop Codons—having presumably been refined by the process of Natural Selection to have good autocorrelation properties.

For code lengths up to about 32 bits, it is practical to perform a brute force search to discover codes which have the minimum off-peak autocorrelation, albeit necessarily now greater than 1. The term "Barker Codes" will be generalized here to include non-perfect codes longer than 13, which nevertheless exhibit by design a minimum possible worst-case autocorrelation with shifts of themselves. For example, thousands of 24-bit codes may be found which have an off-peak autocorrelation of +/−3. If the further condition is imposed that the number of 1's and 0's must be equal (zero net DC term) then there are still hundreds of 24-bit codes with a worst-case off-peak autocorrelation of +/−3. A few typical 24-bit codes found are shown below:

000000110011110101011011
000110010011110010101011
001000100011111011010011

When using some types of modulation, such as OQPSK or GMSK as described later herein, a further condition may be imposed that requires equal numbers of 1's and 0's in the even numbered code bits (I-bits) and also in the odd-numbered bits (Q-bits) so that a direct conversion receiver does not have to preserve DC components of the received signals.

Codes such as exemplified above, while exhibiting a symmetrical autocorrelation function, do not necessarily exhibit a symmetrical cross correlation function one code to another. Thus, when different codes are used to distinguish different transmitters, the interference from transmitter A to transmitter B with a given delay difference may not be the same as the interference from B to A with the delay-difference the other way around. If the condition of symmetrical mutual interference between two different codes is desired, this can be achieved by using palindromic codes, in which the first half of the bits are the time-reverse of the second half of the bits. A length 48 palindromic code requires a search of only 224 possibilities to find palindromic codes with minimum self-correlation, which can be done by a brute force search in a few minutes. Moreover, modulo-2 adding the sequence 1010101 . . . to a palindromic code with an even number of bits has the effect of negating every alternate autocorrelation value which does not change the magnitude, but it converts the palindromic code to a skew-palindromic code in which the first half is the time-reverse complement of the second half. Skew-palindromic codes thus automatically exhibit zero DC. An example of a skew-palindromic 48-bit Barker code is:
110001001111010111011011001001000101000011011100

Skew-palindromic sequences are also found in DNA sequences, enabling them to fold into "hairpin" structures.

If the use of a palindromic code, and its skew-palindromic counterpart derived as described above, are used for alternate transmit bursts, then when signals are averaged over an even number of bursts, the self-correlation is zero on half of the bit-shifts.

If the N-bit code of a transmit burst is complemented, it does not affect its autocorrelation, but its cross correlation to another, non-inverted code is negated. This provides a method to render different transmitters orthogonal without changing their autocorrelation properties. The code used by a first transmitter is either inverted or not on successive transmit pulses according to a first burst-rate inversion pattern. The code used by a second transmitter is also inverted or not on successive transmit bursts according to a second inversion pattern, orthogonal to the first inversion pattern, or nearly so. Thus, the cross correlation between the code of the first transmitter and the code of the second transmitter is negated on half of the transmit bursts and not negated on the other half, resulting in zero or near-zero cross-correlation when averaged over the length of the first and second inversion patterns, which is the length of the scan. Known inversion patterns that are orthogonal include the Walsh-Hadamard codes. Different shifts of an M-sequence of length $M=2^L-1$ also provide almost-orthogonal codes, and if extended by an additional zero, are exactly orthogonal and are actually bit-order scrambled versions of the Walsh-Hadamard code set. Below is an example of two transmit sequences rendered orthogonal by the above means:

1110010 1110010 0001101 0001101
0100111 1011000 0100111 1011000

The first sequence is formed from the 7-bit Barker code 1110010. It is repeated four times with an inversion pattern 0 0 1 1, where 0 means not inverted and 1 means inverted. The second sequence is another 7-bit Barker code (it is the first code time-reversed) and is repeated with an inversion pattern 0 1 0 1. By counting like and unlike bits it may be seen that the cross correlation between the two first bursts is −1; between the $2^{nd}$ two transmit bursts is +1; between the $3^{rd}$ bursts it is +1 and between 4th bursts it is −1. Thus, when averaged over the four-bit inversion pattern length, the cross-correlation is exactly zero. With an inversion pattern length of $2^L$, $2^L$ orthogonal patterns can be found to make $2^L$ transmitters mutually orthogonal. Thus, different transmitters using the same code or different codes may be rendered orthogonal by use of orthogonal, burst-rate inversion patterns.

FIG. 6 illustrates the use of skew-palindromic codes for four transmitters. The first transmit burst of transmitter 1 uses the 48-bit code: b1, b2, b3 . . . b23, b24, b24, b23, b22 . . . b2, b1 un-inverted because the first bit of transmitter 1's burst-rate inversion sequence (1000) is a zero, signifying no inversion. The same code is used inverted for transmitters 2, 3, and 4 because the corresponding first bit of their respective inversion patterns (1001, 1002, 1003) is a "1". The second transmit bursts of transmitters 1, 2, 3, and 4 use code: c1, c2, c3 . . . c23, c24, c24, c23 . . . c2, c1 inverted or not according to the second bits of their corresponding burst rate sequences (1000, 1001, 1002, 1003). Likewise, the third bursts use code: d1, d2, d3 . . . d23, d24, d24, d23 . . . d2, d1 inverted or not.

When a code is inverted, it negates the cross-correlation function between two transmitters, so that if the burst-rate inversion sequences of all transmitters are mutually orthogonal, the cross-correlation between like range bins of different transmitters will be zero. The correlation between an echo of one transmitter having a first delay and the echo of another transmitter having a second delay will not be zero but will be the average over the whole scan of the cross correlation between their different transmitted bit patterns with a relative shift.

Analyzing the coupling between the echoes from different ranges involves:
(a) expressing the (exemplary 100) correlations for 100 range bins as functions of the 100 signal samples received after the end of each transmit period; and
(b) expressing the 100 signal samples received after each transmit period as a function of the echoes reflected from targets grouped into the 100 different range bins. Note that several targets may be located at the same range but at different azimuths and/or elevations. These will be separated later by MIMO beamforming and/or Doppler shift.

Firstly, processing the received signal samples received due to a single transmit burst is considered, as described as above as the first viewpoint of code construction.

Numbering the bits of the transmit burst in order of last transmitted bit ($b_1$) to first transmitted bit ($b_N$), the first correlation for the nearest range bin having an echo delay of only one bit period after the end of the transmit burst is simply $b1.S1$ where $S1$ is the first signal sample. The second correlation for the second nearest range bin corresponding to an echo delay of two bits after the end of the transmit burst is $b2.S1+b1.S2$ and so forth up to $bN.S1+\ldots+b1.SN$ and then the (N+k)th range correlation is $b_N.S_k+\ldots+b1.S_{N+k}$ up to $N+K=100^{th}$ for the $100^{th}$ range bin. Thus, the first stage (a) of the above-mentioned analysis process is expressed by the following matrix equation:

$$\begin{pmatrix} \text{Correlation1} \\ \text{Correlation2} \\ \text{Correlation3} \\ \vdots \\ \vdots \\ \vdots \\ \vdots \\ \vdots \\ \text{Correlation100} \end{pmatrix} = \begin{bmatrix} b1 & 0 & 0\ldots & \ldots & \ldots & \ldots & \ldots & \ldots & \ldots & \ldots & 0 \\ b2 & b1 & 0 & 0\ldots & \ldots & \ldots & \ldots & \ldots & \ldots & \ldots & 0 \\ b3 & b2 & b1 & 0 & 0\ldots & \ldots & \ldots & \ldots & \ldots & \ldots & 0 \\ \vdots & & & \ddots & & & & & & & \vdots \\ \vdots & & & & \ddots & & & & & & \vdots \\ b_N & \ldots & \ldots & \ldots & \ldots & b2 & b1 & 0 & 0\ldots & \ldots & 0 \\ 0 & b_N & \ldots & \ldots & \ldots & \ldots & b2 & b1 & 0 & 0\ldots & 0 \\ \vdots & & \ddots & & & & & \ddots & & & \vdots \\ \vdots & & & \ddots & & & & & \ddots & & \vdots \\ 0 & 0\ldots & \ldots & \ldots & \ldots & \ldots & b_N & \ldots & \ldots & b2 & b1 \end{bmatrix} \begin{pmatrix} S1 \\ S2 \\ S3 \\ \vdots \\ \vdots \\ \vdots \\ \vdots \\ \vdots \\ S100 \end{pmatrix} \quad \text{Equation (1)}$$

Stage (b) expresses the signal samples received in terms of the echoes from targets lying at ranges of 1 to 100 delay bins distant. Signal sample 1 is the first echo amplitude times the transmitted signal $b1$ plus the second echo amplitude times the second transmitted bit $b2$ up to transmitted bit $N-1$ times the $(N-1)$th echo amplitude. Echoes delayed N bins or more do not overlap with the first signal sample. Signal sample 2 is $b1$ times the 2nd echo amplitude plus $b2$ times the 3rd echo amplitude up to bit $N-1$ times the Nth echo amplitude. Signal sample 100 is just $b1$ times the 100th echo amplitude as it is supposed that there are no echoes delayed more than 100 bits. The complex signal samples are thus expressed in terms of target complex echo amplitudes by matrix equation (2) below:—

$$\begin{pmatrix} S1 \\ S2 \\ S3 \\ \vdots \\ \vdots \\ \vdots \\ \vdots \\ \vdots \\ S100 \end{pmatrix} = \begin{bmatrix} b1 & b2 & b3\ldots & \ldots & \ldots & b_{n-1} & 0 & 0 & 0\ldots & \ldots & \ldots & 0 \\ 0 & b1 & b2 & b3\ldots & \ldots & \ldots & b_{n-1} & 0 & 0 & 0\ldots & \ldots & 0 \\ 0 & 0 & b1 & b2 & b3\ldots & \ldots & \ldots & b_{n-1} & 0 & 0 & 0\ldots & 0 \\ \vdots & & & \ddots & & & & & \ddots & & & \vdots \\ \vdots & & & & \ddots & & & & & \ddots & & \vdots \\ \vdots & & & & & \ddots & & & & & \ddots & \vdots \\ 0 & 0\ldots & \ldots & \ldots & 0 & b1 & b2 & b3\ldots & \ldots & \ldots & \ldots & b_{n-1} \\ 0 & 0\ldots & \ldots & \ldots & \ldots & 0 & b1 & b2 & b3\ldots & \ldots & \ldots & b_{n-1} \\ \vdots & \vdots & & & & & & \ddots & \ddots & & & \vdots \\ \vdots & \vdots & & & & & & & \ddots & \ddots & & \vdots \\ 0 & 0\ldots & \ldots & \ldots & \ldots & \ldots & \ldots & \ldots & \ldots & 0 & b1 & b2 \\ 0 & 0\ldots & \ldots & \ldots & \ldots & \ldots & \ldots & \ldots & \ldots & \ldots & 0 & b1 \end{bmatrix} \begin{pmatrix} \text{Echo1} \\ \text{Echo2} \\ \text{Echo3} \\ \vdots \\ \vdots \\ \vdots \\ \vdots \\ \vdots \\ \text{Echo100} \end{pmatrix} \quad \text{Equation (2)}$$

The echo amplitudes being the desired values, these are obtainable by inverting equation (2) alone. Since the matrix of code bit values is fixed, it can in principle be pre-inverted and stored. Moreover, the pre-inversion can be simplified, and the storage reduced to 199 values instead of 100 squared values by noting that the matrix is real and Toeplitz, with a 199-element generating vector comprising 99 zeros followed by the first N−1 bits of the code followed by (101−N) zeros. All elements of the inverse of a Toeplitz matrix can be simply expressed in terms of a derived vector, which is no longer than the generating vector, using the Gohberg-Semencul formula. However, performing that operation for every transmit burst may be power consuming, and the signal values are as yet too noisy to be useful, having not yet been averaged over many transmit bursts. Therefore, if such processing were used, it would preferably be done after averaging many transmit bursts, which is further described below.

The following shorthand notation will be used:

Ck is the 100-element correlation column vector defined by equation (1) for the kth transmit burst;

[Pk] is the 100×100 matrix of bits formed from the code used for the kth transmit burst used in equation (1)

Sk is the 100 element column vector of signal samples received during the receive period after the kth transmit burst;

[Qk] is the 100×100 matrix of bits used in equation (2), and Rk is the 100-element column vector of range bin echo values on the RHS of equation (2).

Then using the above notation, we can write equation (1) as:

$$Ck=[Pk]Sk;$$

and equation (2) as:

$$Sk=[Qk]Rk.$$

Thus, we can substitute from the latter into the former to obtain Ck=[Pk][Qk]Rk.

Now assuming that the complex echo amplitudes are the same from one transmit bin to the next, i.e. Rk=R for all k, that is zero Doppler shift, sum the latter equation over all k from k=1 to k=M and take out R as a common factor to obtain:

$$\Sigma Ck=[\Sigma[Pk][Qk]]R; \text{ or}$$

$$R=[\Sigma[Pk][Qk]]^{-1}\Sigma Ck \quad (3)$$

The inverse matrix in equation (3) is fixed as it depends only on the M×N bits used for the M, N-bit transmit bursts, so can be computed in advance once and for all and stored. Equation (3) therefore suggests computing the correlation vectors Ck for each transmit burst, summing them over all transmit bursts k=1 to M, and then once every M transmit bursts the sum of the correlations is multiplied by the prestored matrix inverse to yield the target echo values in each range bin (the vector R).

Ideally, we would like if possible, to choose the codes so that this matrix was the unit matrix or close thereto, or had a simple and preferably explicit inverse. It will be shown that a specific use of M-sequences achieves such simplification.

If Doppler is present, successive values of Rk (and therefore Ck) will exhibit a progressive phase twist. Therefore, to determine if there are moving targets with Doppler shift lying at specific ranges, the values Ck may first be de-twisted by the negative of the phase rotation expected for the postulated Doppler shift and then summed before applying equation (3). This is done for every postulated Doppler shift most efficiently using Fast Fourier Transforms. The process of Fourier transforming the 100M correlations C(i,j) (i=1 to 100, j=1 to M) obtained for 100 range bins times M transmit bursts is illustrated by matrix equation (4) below:

$$\begin{bmatrix} C(1,1) & \ldots & \ldots & C(1,M) \\ C(2,1) & \ldots & \ldots & C(2,M) \\ \vdots & & & \vdots \\ \vdots & & & \vdots \\ \vdots & & & \vdots \\ C(100,1) & \ldots & \ldots & C(100,M) \end{bmatrix} \quad \text{Equation 4}$$

$$\begin{bmatrix} 1 & 1 & \ldots & \ldots & 1 & \ldots & \ldots & \ldots & 1 \\ W^{50} & W^{49} & \ldots & W^1 & 1 & W^{-1} & W^{-2} & \ldots & W^{-49} \\ W^{100} & W^{98} & \ldots & W^2 & 1 & W^{-2} & W^{-4} & \ldots & W^{-98} \\ \vdots & & & & 1 & & & & \vdots \\ \vdots & & & & 1 & & & & \vdots \\ \vdots & & & & \vdots & & & & \vdots \\ \square & \square & \square & W^{M-1} & 1 & W^{-(M-1)} & \ldots & \ldots & \ldots \end{bmatrix}$$

The matrix on the right hand side is a Fourier Transform matrix in which W is the Mth principal root of unity. Each column represents summing a row of M C-values with a different phase twist corresponding to a different Doppler hypothesis. In the above matrix, the Doppler is hypothesized to lie between −50 cycles per period of M transmit bursts to +49 cycles, but other matrices could be used in which for example only positive Doppler or only negative Doppler is hypothesized, or the Doppler is hypothesized to be likely greater in one direction than the other. The column of 1's down the center of the Fourier matrix represents summing each row of M C-values with the assumption of zero Doppler.

The above equation can be thought of as transforming the 100×M matrix of C-values, which represent 100 range correlations performed for M successive time instants, into a matrix of 100×M transformed values that represent 100 range correlations with M Doppler hypotheses for each. The untransformed values may be called range-time bins and the transformed values may be called range-Doppler bins. Finally, the range-Doppler bins are transformed to target amplitudes in the range-Doppler bins by performing the matrix multiplication of equation (3) for each column of transformed C-values to remove range-bin to range-bin coupling.

The determination of values for 100 range bins and M=1023 Doppler values on the basis of the echoes of 1023 receive sample sets of 100 samples, is possible on just information-theoretic grounds. This may be regarded as solving a set of 102,300 simultaneous equations in 102,300 unknowns. The determination is reliable only so long as the determinant of the matrix of equations is not ill-conditioned, i.e., it must have no very small eigenvalues. This is achieved when the transmitted 49,104 bit codes have low mutual cross-correlation. The requirement is however not as stringent when it is recognized that the Doppler Cube is likely to be very sparsely populated. Processing therefore can aim to identify the minimum number of targets that adequately explain all of the 100×1023 received samples within a noise variance, each target being defined by a range, a Doppler, and a Boresight. A good method of achieving the latter is to identify the strongest targets first, subtract out their contributions to the 100×1023 signal values to leave a residual, then to reprocess the residual to identify weaker targets, and so forth until any residual targets lie near the noise floor.

MIMO (Multiple-Input, Multiple-Output) comprises performing all of the above for each combination of a transmitter and a receiver. If there are n transmitters and m receivers this gives n*m times the above 100×M values resulting in the "Radar Cube" of dimensions 100×M×nm. The last dimension of size nm corresponds to the elements of a virtual antenna array. By choosing the spacings of the transmit and the receive antennas in specific ways, the virtual antenna array may be configured to be a linear array of approximately nm elements, or a rectangular array of nm elements, or other configuration. The 3rd dimension into which targets are partitioned in the radar cube for a burst-digital FM MIMO radar is to perform beamforming over the virtual array elements to separate targets by azimuth and/or elevation as well as by range and Doppler. Thus, each target may be characterized in the four dimensions of azimuth, elevation, range and rate of change of range or velocity. Azimuth and Elevation may however be consolidated into the single dimension of "boresight" or direction of arrival. Other tracking algorithms may be used to process this data from one radar scan period to the next to more accurately determine target trajectories and thus past, present, and future target positions in the three spatial dimensions by utilizing the fact that Doppler is the time derivative of range. Thus, a target with Doppler, if followed, will be seen to change in range. Its track is thus inevitably constrained, with suitable scaling of units by an equation of the form: Range (t+dt)=Range(t)+Doppler*dt.

If beamforming is performed last, the partial correlations of different receivers have to be combined using separate FFTs for each receiver and transmitter code prior to beamforming. The Doppler FFTs can instead be performed after beamforming of the partial correlations for each receiver and transmitter. Since the number of beams however is almost equal to the product of the number of transmitters and receivers, the effort may be the same unless some reason exists for not computing Doppler of certain directions.

The second viewpoint on code construction ignores the cross-correlation properties of single partial correlation sets. Instead, the 1023×48 bit codes transmitted by each transmitter over a scan are regarded as single 49,104-bit codes, which should thus have as close as possible to the ideal property that the total scan, seen as a 49,104 bit string with gaps between each 48 bits, should exhibit near zero correlation with any 1 to 47-bit shift of itself and between different transmitter signals. More particularly, referring to FIG. 4, the rightmost bit of the N-bit digital pattern, which is the last bit to be transmitted, is the only bit received from the nearest target that will be received free from own transmitter interference, and it overlaps the second last transmitted bit received via a 2-bit delayed echo, overlaps the 3rd last transmitted bit received via a 3-bit delayed echo, and so forth. Thus, assembling all of the last transmitted bits from the exemplary 1023 transmitted bursts and overlaying them with the 1023-bit word formed from the 2nd last transmitted burst should show near zero correlation, that is, the number of bits that are the same should closely equal the number of bits that are different, and likewise when the 100-bit pattern of 3rd last transmitted bits is overlaid, and so forth. For the rest of this description of a short-range radar, the numbers 48 bits per transmit burst, 100 bits of receive sampling time, and 1023 transmit bursts per scan will be used as exemplary, but this shall not be regarded as limiting and many other choices can be made to work for different applications with different maximum range requirements. Parameters of a longer-range radar system will be described later.

The nature of the matrix [Σ[Pk][Qk]] will now be examined more closely. The function of the inverse of this matrix is to perform interference cancellation between different range bins of the same transmitter when the transmitted symbol patterns used for correlation for the different range bins are not mutually orthogonal.

Consider the first row of [Pk] multiplying [Qk] to obtain the first row of the product as: b1.b1, b1.b2, b1.b3, b1.b4 . . . b1.bN−1000 . . . 0 for one transmit burst, and then this is summed over all M transmit bursts in which the vectors b1 . . . $b_{N-1}$ are not necessarily the same for each. Whatever the b1 are, their squares are unity so the leading term sums over M transmit/receive periods to M.

FIG. 5 shows the notation used for bits placed in different transmit bursts. The bits placed in a first transmit burst are denoted b1(1) to b48(1) and those placed in a second transmit burst are denoted by b1(2) to b48(2) and by b1(k) to b48(k) in burst number k, where k may vary from 1 to 1023 (or may be 1024) over a whole scan.

The sequence b1(k), k=1 to M can be chosen to be a length M pseudorandom sequence. For example, if $M=2^{L-1}$, it can be an M-sequence. Consider L=10, M=1023 and b1(k) for k=1 to 1023 to be a length 1023 M-sequence. According to the second viewpoint of code construction, let b2(k=1 to M) be the same sequence cyclically shifted by 1, that is b2(k)=b1(k+1). Then Σ b1(k).b2(k) over k=1 to 1023 equals Σ b1(k).b1(k+j), which is the correlation of the M-sequence with itself cyclically shifted one bit, which is known to be −1 from the autocorrelation properties of M-sequences. Likewise, if we let b3(k) be b1(k+2) i.e., the same sequence shifted 2 places, and so forth with bj(k)=b1(k+j), then all the remaining terms of the first row sum to −1.

It may now be determined that this choice for the transmitted codes makes the second row of [Pk] times [Qk] equal to; −1, 2M, −2, −2, −2 . . . −2, −1, 0, 0, 0, . . . 0

The third row of [Pk] times [Qk] yields: −1, −2, −3, 3M, −3, −3, −3 . . . −3, −2, −1, 0, 0, . . . 0, and so forth to the Nth row of [Pk] times [Qk] which yields: −1, −2, −3, −4 . . . −(N−1) (N−1)M, −(N−1)−(N−2) . . . −3, −2, −1. The matrix is seen to be strongly diagonal and hence likely to have a simple inverse.

The elements (l,j) of P(k) are $b_k(i-j+1)$ for 0<i−j+1≤N and zero elsewhere and the elements (i,j) of Q(k) are $b_k(j-i+1)$ for 0<i−j+1≤N−1. Furthermore bk(i)=d(|i+k|M) where d is an M-sequence of length $2^L-1$.

Similar, but less structured code cross-correlation matrices arise when Barker codes are used, the Barker codes being inverted or not according to a different burst-rate code for each transmitter.

If the same Barker code is used for every burst, its self-correlation properties are not improved when averaged over the scan. To obtain improved self-correlation, different Barker codes can be used in every burst, chosen so that a positive self-correlation value with a particular shift of a first code is reduced by a negative self-correlation value for the same shift of a second code. The following procedure may be conceived for determining a sequence of Barker-like 48-bit codes to be used over a scan by all transmitters alike, the transmitters being distinguished by adding a different one of a set of burst-rate orthogonal codes to each.

A first 48-bit Barker-like code is chosen at random. It may be, for example, a skew-palindromic code or a code with other DC term constraints as discussed above. Then a second code is searched for which, when its self-correlation function is combined with the self-correlation function of the first code, reduces the value of the worst-case combined self-correlation to minimum. If two second-codes yield the same worst-case combined self-correlation, then the second worst self-correlation can be used as an arbiter, and so on. The second code may or may not have additional constraints such as being palindromic, skew palindromic, equal numbers of 1's and 0's in both and I and Q, and so forth. This procedure is repeated to obtain a third code, and so forth, until a complete scan-set of 1023 or 1024, 48-bit codes is derived for which the combined off-peak autocorrelation values are a minimum. Many different sets will be found depending on the starting code and the constraints placed on the other codes during the search, and since it is believed that the procedure has been adequately described above in such a way that it may carried out by a person of average skill, the discussion of this method is terminated here for the sake of brevity. The autocorrelation matrix that results will be strongly diagonal with weak off-diagonal terms, of the form $[\wedge+\Delta]$ where $[\wedge]$ is the diagonal matrix and $[\Delta]$ is the off-diagonal part, and this has the first-order inverse.

$[I-\wedge^{-1}\Delta][\wedge^{-1}]$ which does not involve significant computation and a second order or higher inverse may be computed from $[I-\wedge^{-1}\Delta+[\wedge^{-1}\Delta]2-[\wedge^{-1}\Delta]3 \ldots ][\wedge^{-1}]$ as long it converges.

The above procedure minimizes the autocorrelation function of one transmission with itself, measured over the whole scan. However, it does not minimize the cross-correlation of one transmitter with another. Despite choosing the burst-rate codes of different transmitters to be orthogonal, this only renders like range bins of the different transmitters orthogonal. There remains pollution between different range bins of different transmitters which may have to be removed later by a matrix decorrelating operation or interference subtraction, or by including minimax reduction of those too in the optimization process described above Now return to the second viewpoint on code construction, in which the short-time properties of the partial correlations are ignored and instead only the properties of the full-scan correlations are considered.

For the nearest range bin, the first signal sample s1(1) of receive period (1) is modulated with the last bit transmitted, namely b1(1). This is overlapped by the second most distant range bin modulated with b2(1), and so forth. In the next transmit period, the first signal sample s1(2) of the second receive period is modulated with b1(2) and is overlapped with the second most distant range bin modulated with b2(2).

The correlation for the first range bin is thus given by $b1(1).S1(1)+b1(2)s1(2) \ldots +b1(1023).s1(1023)$ Likewise, the partial correlation for the second range bin using only the first signal samples is given by b2(1).s1(1)+b2(2s1(2) . . . +b2(1023).s1(1023). For the two 1023-bit codes, b1(1) . . . b1(1023) and b2(1) to b2(1023), to be near-orthogonal, the first can be selected to be an M-sequence and the second can be selected to be any cyclic shift of that same M-sequence. If that M-sequence is denoted by b1 . . . b1023, and the first code is selected so that b1(1) . . . b1(1023)=b1 . . . b1023, then the second code b2(1) . . . b2(1023) may be selected to be b2 . . . b1023, b1, i.e., a cyclic rotation of one place of the first code. Likewise, all other bits of the 48-bit codes can be selected to be any other cyclic shifts of the same M-sequence with the result that all full-scan correlations with then be near-orthogonal. Selecting adjacent shifts for successive bursts of the 48 bits codes gives the first transmit burst as comprising (b48, b47 . . . b2, b1); the second burst as comprising (b49, b48 . . . b3, b2); the third comprises b50, b49 . . . b4, b3) and so forth to the 1023rd transmit burst being (b47, b46 . . . b1, b1023), the code having come full-circle again.

The second range bin also adds the correlation over the whole scan with all second signal samples to the correlation with all first signal samples; the third range bins additionally add correlations with all third signal samples, and so forth. However, to begin with, the correlations with only the first signal samples, one from each receive period, will be considered, as represented by the matrix equation (5) below:

$$\begin{pmatrix} C(\text{range bin 1}) \\ \vdots \\ \vdots \\ \vdots \\ \vdots \\ \vdots \\ \vdots \\ c(\text{range bin 48}) \end{pmatrix} =$$

$$\begin{bmatrix} b1 & b2 & b3 & \ldots & \ldots & \ldots & \ldots & \ldots & \ldots & b1023 \\ b2 & b3 & b4 & \ldots & \ldots & \ldots & \ldots & \ldots & b1023 & b1 \\ b3 & b4 & b5 & \ldots & \ldots & \ldots & \ldots & \ldots & b2 & b1 \\ b4 & b5 & b6 & \ldots & \ldots & \ldots & \ldots & b3 & b2 & b1 \\ \vdots & & & & & & & & & \\ \vdots & & & & & & & & & \\ \vdots & & & & & & & & & \\ \vdots & & & & & & & & & \\ b48 & b49 & \ldots & \ldots & \ldots & \ldots & b1 & \ldots & b46 & b47 \end{bmatrix} \begin{pmatrix} s1(1) \\ s1(2) \\ s1(3) \\ \vdots \\ \vdots \\ \vdots \\ \vdots \\ S1(1023) \end{pmatrix}$$

The rows of the matrix are cyclic rotations of the 1023-bit M-sequence, and are not perfectly orthogonal, having a zero-shift correlation of 1023 and otherwise −1 for any non-zero shift. Accordingly, the correlation for each range bin would contain a ratio of 1023 parts of the wanted correlation to −1 part of each of the other 47 bits. The correlation matrix is shown below:

$$\begin{bmatrix} 1023 & -1 & -1 & -1 & -1 & \ldots & \ldots & -1 \\ -1 & 1023 & -1 & -1 & -1 & \ldots & \ldots & -1 \\ -1 & -1 & 1023 & -1 & -1 & \ldots & \ldots & -1 \\ & & & \vdots & & & & \\ & & & \vdots & & & & \\ & & & \vdots & & & & \\ & & & \vdots & & & & \\ -1 & -1 & -1 & \ldots & \ldots & \ldots & -1 & 1023 \end{bmatrix}$$

Removing the −1 part in 1023 pollution of one range bin by each of the others can be achieved by multiplying by the inverse of the above correlation matrix. The matrix is now purely Toeplitz, but there is an even simpler method than Toeplitz inversion available as the matrix has a simple, explicit inverse. Observe that the matrix may be written as:

$$1024\left[[I] - (1/1024)\begin{bmatrix} 1 & 1 & 1 & 1 & \ldots & \ldots & \ldots & 1 \\ 1 & 1 & 1 & 1 & \ldots & \ldots & \ldots & 1 \\ & & & \vdots & & & & \\ & & & \vdots & & & & \\ & & & \vdots & & & & \\ 1 & 1 & 1 & 1 & \ldots & \ldots & \ldots & 1 \end{bmatrix}\right]$$

where I is a 48×48 unit matrix and the matrix of ones is of size 48×48. Just as the reciprocal of (1-x) is equal to 1+x+x2+x3, when x is a scalar less than 1, and may even be approximated to just 1+x, when x is very much less than 1, so the inverse of the above matrix may be approximated to:

$$(1/1024)\left[[I] + (1/1024)\begin{bmatrix} 1 & 1 & 1 & 1 & \ldots & \ldots & \ldots & 1 \\ 1 & 1 & 1 & 1 & \ldots & \ldots & \ldots & 1 \\ & & & \vdots & & & & \\ & & & \vdots & & & & \\ & & & \vdots & & & & \\ 1 & 1 & 1 & 1 & \ldots & \ldots & \ldots & 1 \end{bmatrix}\right]$$

The exact inverse is also very simple. Calling the matrix of 1's D, the exact inverse is $(1/1024[I+D/1024+(D/1024)^2 \ldots]$ Now observing that $D^2=48D$, $D^3=48^2D$, and so on, and that $1+48/1024+(48/1024)^2 \ldots =1/(1-48/1024)=1024/(1024-48)=1024/972$, the exact inverse is: $(1/1024)[I+(1/972)D]$ More generally, the explicit inverse of the correlation matrix of the L correlations of a signal with L shifts of an M-sequence is: $(1/(M+1))[I+(1/(M-L+1))D]$, where I is the L×L unit matrix and D is an L×L matrix of 1:s. When I and D are both of size 1023×1023, the inverse of $[I-(1/1024)D]$ is $[I+D]$.

When applied to the vector of correlations between the first column of code bits and the first signal sample of the first receive period, matrix multiplication by the above orthogonalizing matrix becomes trivial as shown by the equation listed below:

$$\frac{1}{1024}\left[I_{48\times48} + \frac{1}{972}D_{48\times48}\right]\begin{pmatrix} b1 \\ \vdots \\ \vdots \\ b48 \end{pmatrix} S1(1) =$$

$$\frac{1}{1024}\left[\begin{pmatrix} b1 \\ \vdots \\ \vdots \\ b48 \end{pmatrix} S1(1) + \frac{n1}{972}\begin{pmatrix} 1 \\ 1 \\ \vdots \\ 1 \end{pmatrix} S1(1)\right],$$

where n1 is the difference between the number of 1's and the number of 0's (i.e., −1's) in the 48 code bits: b1 to b48.

On a sample-by-sample basis, the above equation comprises multiplying each sample by the first bit of each code and subtracting n1/972 times the sample from each value so obtained. When summed over all receive periods, taking account of the value n1 being replaced by n2, n3, n4 etc. for respective receive periods, the procedure becomes:

Step 1: Correlate the 1023 signal samples with each shift of the 1023-bit code as normal (e.g. by using a Fast Walsh Transform).

Step 2: Orthogonalize the correlations by adding to each 1/972 times the correlation of the 1023 signal samples with the integer sequence n1, n2 . . . n1023 where ni is the excess of the number 1's over the number of 0's in the 48-bit code segment starting at bit i. The de-correlating steps above have the effect of preventing ghosts of a large echo from appearing as small false echoes. These would naturally have been suppressed by the factor 1023, which is about 60 dB, but the orthogonalizing or de-correlating steps above reduce the cross-coupling between range bins to negligible proportions. Such decorrelating may be optional depending on the application, as may the length M of the M sequence, the frequency of processing, the modulation, the bit rate and so-on.

Thus, nothing need be done until 1023 successive receive periods have occurred and 100 signal samples have been saved for each, a total of 102,300 complex samples. In the exemplary system, where a 48 ns transmit burst is followed by a 100 ns receive period occurs once every 480 μs; this takes 1023×480 μs which is 491.04 ms or just under half a second. Processing 102,300 complex samples every 491.04 ms effectively means processing approximately 208,333 complex samples per second, which is not a high rate, but the number of arithmetic or bit operations used to process each sample is the main factor that will determine power consumption. Note that, on any transmit or receive period, it can be decided to process the last 1023 sets of samples collected if it is desired not to wait any longer. Thus, in principle continuous re-estimation of the range bin contents can be done after every transmit-receive period, i.e. every 480 μs, or done at any other desired periodicity. For example, when a short-range radar is used as a battery-operated security sensor, to save power, it may be decided to process less frequently until some predetermined change occurs and then to increase processing frequency temporarily to a fast rate until the disturbance has been evaluated or has passed by. Processing frequency can also depend on time-of-day, for example, becoming less frequent when authorized personnel are known to be present to assure security.

Orthogonalization can also be used when transmit codes are Barker sequences, Palindromic Barker codes or Skew-Palindromic Barker codes. The same 48-bit code may be used in each transmit burst, but, as suggested above, it is inverted in successive transmit periods by bits selected from a unique cyclic shift of an M-sequence for each transmitter. However, the orthogonalization procedure will be different for Barker codes, as the matrix D of 1's above is replaced by the matrix Δ, the powers of which are not necessarily simply a multiple of itself, and the complexity of orthogonalization for Barker codes depends on how successfully the code search procedure disclosed above was able to find a sequence of codes with near zero off-diagonal terms of the total autocorrelation matrix for different ranges and different transmitters, when averaged over the whole scan.

The above process of orthogonalizing correlations of signal samples from a receiver with a number of shifts of an M-sequence representing differently delayed echoes can also be applied to orthogonalizing the correlations of signal samples with shifts of an M sequence representing not only differently delayed echoes but also different transmitters. In the case where 4 transmitters are used with a number of receivers in a MIMO system, the first transmitter can be allocated to use the first 48 shifts of a 1023-bit M-sequence, the first shift comprising the last transmitted bit from each of 1023 successive transmit periods, the second shift comprising the second last transmitted bit from each of the successive transmit periods and so on up to the 48th shift comprising the first transmitted bits; then shifts 49 to 96 are allocated likewise to a second transmitter and so on up to shifts 145 to 192 of the 1023-bit M-sequence being used by a 4th transmitter. Thus, after collection of 1023 successive receiver periods of 100 signal samples each, it is desired to perform correlations of 1023 corresponding signal samples from 1023 successive signal periods with 192 cyclic rotations (shifts) of the M=1023 M-sequence, the correlations representing 48 range bins×4 transmitters.

For the first viewpoint, correlations were computed from the bits within each receive burst first to form partial correlations, then partial correlations were combined from different bursts across the whole scan by FFT to differentiate by Doppler. Different transmitters were distinguished by applying a burst rate orthogonal code to each to invert or not invert the burst bit pattern used, which renders the transmitter-to-transmitter code correlation near zero for same range bins but required a special code search procedure to ensure that the code of a transmitter has low off-peak correlation with itself. The correlation between one range bin of one transmitter and a different bin of a different transmitter was not optimized by this procedure, but could be by selecting code sequences that minimize the greatest of all unwanted correlations.

By contrast, from the second viewpoint of code construction, correlation of one bit per burst is performed across the whole scan first to form partial correlations, and then partial correlations corresponding to the same range bin are combined to form the whole correlation for each range bin. The second viewpoint provided the insight that shifts of a single M-sequence could be used to fill all transmit bursts of all transmitters across the whole scan while making transmitter cross-correlations near zero for all range bins and off-peak self-correlations near zero for all range bins. The condition necessary for achieving this is that the scan length in transmit bursts should be at least equal to the product of the number of transmitters times the number of bits per burst, as that is the number of different cyclic shifts of the M-sequence that are required. If that condition is not fulfilled, the number of overlapping transmitters can be reduced by making some transmitters transmit in the idle times between others, at least in low duty-factor systems.

When multiple transmitters are considered, e.g. four transmitters, Equation 6 is simply adapted by increasing the matrix sizes from 48×48 to 192×192, changing the number 972 to 832, changing the vectors (b1 . . . b48) to (b1 . . . b192), and defining ni to be the excess of 1's over 0's in the code sequence bi to b(191+i). Decoding of all range bins for all transmitters reduces to performing a correlation with 192 cyclic shifts of the 1023-bit code, which can be done efficiently using a single pass of a Fast Walsh Transform algorithm, and also correlating the 1023 signal samples with the integer sequence n1 . . . n1023, and subtracting 1/832 of the latter from each correlation. Note that this assumes that all four transmitters are active and illuminating the targets equally. If at times there are more or fewer transmitters operating, then the numbers n1 . . . n1023 and the divisor (832 or 972 etc.) may be adjusted according to the number of shifts of the code transmitted in total by the active transmitters.

It will now be described how the Fast Walsh Transform (FWT) may be used to efficiently perform 192 separate 1023-point correlations in order to use less battery power than a brute force method.

It is known that an M×M matrix of all cyclic shifts of an M sequence can be extended to a 2L×2L matrix by appending a row and a column of 0's. The matrix is then an orthogonal binary matrix, and all orthogonal binary matrices can be derived from the set of Walsh-Hadamard codes by interchanging rows and columns in a specific way. Thus, correlating a set of samples with all shifts of an M sequence can be performed by using an M+1 point FWT with the input sample vector extended to M+1 values by appending a null value and presented in a predetermined first scrambled order, the outputs being delivered in a predetermined second scrambled order, M of which are the desired correlations and an M+1th output is the mean value of the samples which can be discarded or possibly used for DC offset correction. Alternatively, the allocation of bit shifts of the M-sequence to different ranges and transmitters can be pre-selected such that the second scrambled order of outputs is already sorted by range and transmitter without unscrambling the order.

Correlation of the now M+1=2L extended signal samples with all rows is equivalent to matrix multiplication of the vector of signal samples by the orthogonal matrix, and this can be done in L.2L operations, that is (M+1)Log 2(M+1) operations instead of (M+1)2 operations, in a way very analogous to a base-2 FFT. In fact, it is identical to a base-2 FFT with the "twiddling" operations omitted. The omission of twiddling results in the FWT needing no multiplies, unlike the FFT. Moreover, when no multiplies are involved, the least significant bit of each output value depends only on the least significant bit of each input value with no delay other than logic delay, and subsequent output bits appear with only logic delay after applying the corresponding input bits.

In software, after implementing the row and column order scrambling by a suitable table-indexing method, the algorithm comprises replacing pairs of signal samples, selected firstly half the transform size apart, with their sums and differences respectively, a so called butterfly operation, then replacing pairs selected successively half as far apart with their sums and differences, and so on until adjacent pairs have been replaced by their sums and differences. The FWT is very amenable to full parallelization and row/column order scrambling for a fully parallelized hardware implementation could be done by crisscross wiring rather than software indexing when the scrambling orders are fixed. If it is desired to have a choice of M sequences however, in order, for example, to reduce interference between different radars, then the scrambling order depends on the M sequence used and the use of indexing tables may be required.

To use a 1024-point FWT process to compute the correlations with 1023-bit M-sequences, a zero valued signal sample is used as the 1024th sample. The 1024 results are computed in 10×1024 operations, which is a huge reduction in effort even when only 192 of the 1024 results are needed. Moreover, the other 832 results have utility in further expanding the processing to include on-demand Doppler detection, as will be described later, and in subtracting the echo signals of already identified targets.

Much of the above description concerned processing only the first received signal sample of each burst, denoted by $S1(1)$ to $S1(1023)$. Exactly the same processing shall be applied to the second received signal samples of each burst, denoted by $S2(1)$ to $S2(1023)$. The resulting 48 correlations per transmitter now are added to range bins 2 to 49. Range bin 1 is thus based on processing only one sample per transmit-receive period, and range bin 2 is based on combining samples 1 and 2 from each transmit receiver period. Likewise, samples S3(1) to S3(1023) are processed identically and the result added to range bins 3 to 50, and so forth. After processing samples S100(1) to S100(1023), 100 range bins will have been populated, with range bin i=1 to i=47 depending on the combined results of i samples from each period and range bins 48 to 100 depending on the combined results of 48 samples from each period. There is thus a gain of 48 in signal to noise ratio for target echoes beyond 47 bits delay and a progressively smaller gain for target echoes nearer than 47 bits of delay, which seems logical, as the targets are nearer and therefore their echoes may be presumed stronger. Target echo range-dependent gain is known in the art of sonar at least and is known as "gain scheduling". Additional gain scheduling may be used in the receivers of the current invention by increasing receiver gain with time after the transmitter stops to keep target echo signals that become weaker with distance within the limited range of an A to D converter. Gain scheduling by ramping transmit power may also be used. Gain scheduling affects the way correlations should be combined because in combining the first and second receive samples for range bin 2, for example, the samples are now scaled differently for the same target at the same range due to the receive gain and/or the transmitter power for those bits having been altered. The combining should now be weighted, combining by down-weighting the value of a sample in proportion to the increase in receiver gain for that sample, and by weighting the sample in accordance with the transmitter power for that transmitted bit in order to maximize the signal to noise ratio of the combination, in a way which is known from the art of diversity combining (i.e. combining samples with higher SNR and with higher weighting to samples having lower SNR and with lower weighting).

When the 192 correlations are performed using an FWT, 1024 correlations are obtained of which only 48 per transmitter represent stationary targets. The stationary target returns may be simply subtracted from the total by setting the FWT results corresponding to the stationary targets to zero. For four transmitters, at that point each set of FWT outputs would comprise 192 zeroed values and 832 nonzero values. To determine the signal samples with the stationary target returns nulled-out, these results may now be inverse-FWT'ed to obtain 1024 signal samples, of which one corresponds to the inserted zero value, and may be reset to zero, discarded, or used to cancel the DC offset. DC offset may be cancelled by, instead of inserting a dummy zero value as the 1024th input, a initial value of zero can be inserted for a first FWT and after every subsequent FWT the 1024th output value is subtracted from the previous 1024th input value to give a new 1024th input value for the next FWT, with this process converging to a value that annuls the DC offset in the input sample vector.

The above process is repeated for each successive signal sample extracted from the 1023 receive sample sets of a scan and the 100 FWTs so performed yield 100×1023 values once more from which the stationary target echoes have been subtracted. This method of subtracting already identified signals is called "interference subtraction by nulling in a transform domain." Such application was the decoding of multiple, overlapping communications signals to recover information conveyed from a transmitter location to a receiver location, but the technique is used herein in a different application, namely in radar system, for separating overlapping target echoes to improve the identification of weak targets in the presence of strong targets. It was explained above that, when processing signals samples in the order S1(1) to S1(1023) up to S100(1) to S100(1023) by respective FWT correlations, the 100 sets of 192 correlations shall be added to corresponding range bins, as illustrated pictorially in FIG. 7.

FIG. 7 comprises 100 Fast Walsh Transform (FWT) processes, labelled FWT1 to FWT100, although for clarity only the first four and FWT53 and FWT100 are drawn. FWT1 processes 1023 values S1(1) to S1(1023) which are the first received samples in each receive period, plus an appended zero or initial value as input sample number 1024. Likewise, FWT2 processes 1023 values S2(1) to S2(1023) and so on up to FWT100 which processes the 1023 last receive samples S100(1) to S100(1023) of each receive period. The first output for FWT1 (after order descrambling if necessary) is the value for range bin 1, for transmitter 1, designated R1Tx1 for short. The second output value of FWT1 is the value destined for range bin 2 for transmitter 1, and so is output 1 of FWT2. The solid arrowed line joining the second output of FWT1 to the first output of FWT2 signifies accumulation of the two values to produce a combined output R2Tx1. Likewise, the solid arrowed lines representing accumulation pass through FWT1 output 3, FWT2 output 2 and FWT3 output 1, producing R3Tx1 and so forth to produce successive range bin values R1Tx1 to R100Tx1. Likewise, corresponding range values for the same transmitter 2, 3 and 4 in turn are combined to produce R1Tx2 to R100Tx2 through to R1Tx4 to R100Tx4. The outputs of each FWT can be orthogonalized individually before accumulation along the solid arrowed lines of FIG. 7, as was described above by correlating the 1023 corresponding signal samples from each burst separately with the sequence of integers n1 . . . n1023 defined above and subtracting $1/832$ of the sum from each of that FWT's outputs. When the process of FIG. 7 is carried out for n transmitters and m receivers, the radar memory at this point is of size 100 range bins×nm transmitter-receiver combinations. When the results are combined by beamforming using the nm virtual antenna elements for each range the radar memory will contain values for 100 ranges times nm boresights.

The expectation for a short-range indoor radar system is that there will be a preponderance of stationary target echoes, many of which will be strong, and a handful of moving targets, which will likely be weaker and temporary. The orthogonalization described above can provide the ability to discriminate weak stationary targets from strong stationary targets, but the discrimination of weak moving targets from strong stationary targets remains to be improved. Moving targets are already orthogonal to stationary targets with the same range but are not yet well-separated from static targets with a different range. When signals from a target with one range are correlated with the code of a different range, the result before the correlation terms are summed up is a shift of the M-sequence, as one shift multiplied by a different shift gives a third shift of the same sequence. If the terms are summed with no phase twist (which is the static target case), the result is −1 times the unwanted correlation as compared with 1023 times the wanted correlation. If, however, the terms of the correlation, which is a shift of an M-sequence, are now summed up with different progressive phase twists corresponding to all possible Doppler hypotheses, the result is the Fourier Transform of the M-sequence. Since the autocorrelation function of an M-sequence is an impulse, its Fourier Transform is flat, so that the energy of a static target having a different, second range appears divided equally between all Doppler bins of a target having a first range. While the flat spectrum property is very desirable, the interference nevertheless is diminished only in power by $1/1023$, that is about 30 dB, instead of the amplitude reduction of $1/1023$ or 60 dB between different range bins with the same Doppler and may be more between different Doppler bins with the same range. If a correlation level −30 dB down is too high to prevent a weak moving target being masked by strong stationary targets, then the strong stationary targets should be subtracted out before searching for Doppler. The method of interference subtraction by nulling in a spectral domain described above may thus be used to condition the signal before performing a Doppler search.

A first method for subtracting out stationary targets prior to Doppler analysis is to set to zero output values corresponding to stationary targets and all transmitter codes, that is, output values 1 to 192 of FWTs 1 to 100 in the exemplary code choice, after performing the accumulation across FWTs shown in FIG. 7. The 1024 output values of each FWT comprising 832 non-zero values and 192 zero values are then inverse FWTed to obtain new input values S(1(1:1023) to S100(1:1023). Each set of 1023 values is then twisted progressively in phase by the negative of an expected Doppler phase change per transmit/receive period and then the twisted values resubmitted to the FWT accumulation process to determine the range or ranges of any target with the expected Doppler. If any target or targets are found of sufficient strength to warrant it, the FWT output values corresponding thereto may be set to zero to subtract them and the process of inverse FWTing and applying another Doppler phase twist repeated until all Doppler's have been searched. If all 1023 Doppler shifts are searched, a total of 1023×2×100 complex 1024-point FWTs will be performed in a period of 0.5 seconds. This amounts to 8 GigaOps per second where an "Op" is a real fixed point add. If Doppler analysis was performed for every 0.5 second scan, this might amount to a significant power consumption. Therefore, it would save power to perform Doppler analysis only when the power/energy in the 832×100 non-zero residual values after subtracting static targets exceeded a threshold indicative of the presence of further, probably moving targets. Moreover, all 1023 Doppler frequencies need not be searched. They may be searched in any order, but searching can be curtailed when the residual energy drops to the noise floor or below a threshold. A previous scan can be used to predict the likely Dopplers to be present and those Dopplers can be searched first.

A second method to subtract the stationary targets is to subtract the combined values denoted in FIG. 7 by R1Tx1, R2Tx2 etc. from the FWT outputs that were added to obtain them. For example, because R3Tx1 is the sum of FWT1 output 3, FWT2 output 2 and FWT3 output 1, one third of R3Tx1 is subtracted from each of those three outputs. Likewise, an appropriate amount of each combined output is subtracted from the FWT outputs that were summed to obtain it. The advantage of the second method is that more of as yet undetected moving target echoes remain in the residual whereas with the first method, more of as yet undetected moving target energy that partially correlated with stationary target codes is lost in the subtraction process.

A third method is to subtract values only if they are strong, for example, 20 dB or more above the minimum values, in which case the residual may then be searched for weaker static targets, with the stronger targets just nulled-out.

The power consumption of the Fast Walsh Transform (FWT) processing will now be estimated. An exemplary 1024-point FWT structure comprises 10 columns of 512 butterfly circuits, where a butterfly is a simultaneous 1-bit add and subtract with carries-in and carries-out that are recirculated using 1-bit delays. A simultaneous add-subtract circuit might be made with fewer transistors than an add and a subtract circuit separately. In a current 28 nm CMOS process, 1-bit adders can be made to perform an addition or subtraction for an energy consumption of between 1 and 10 femtojoules (femto=$10^{-15}$). The ten rows of 512 butterflies perform equivalently 10,240 adds or subtracts per clock cycle at most. The number of clock cycles needed to complete the FWT is equal to the input word length plus 10 extra clocks to flush out the carries. With 6-bit input words from the receiver AtoD converter, 16 clocks are thus needed, giving 163,840 add/subtracts per FWT. An FWT may be done for each of 100 range bins, giving 16,384,000 operations. It must also be done for real and imaginary parts (I/O) of the signal, and for example, an exemplary four (4) receivers, giving 131,072,000 operations. The energy needed is thus between 131,072,000E-15 and 131,072,000E-14 joules, depending on the process and the add/subtract implementation, which gives between 0.13 and 1.3 microjoules. Repeating this for every 0.491 second scan gives a power of between 0.27 and 2.7 microwatts. This is doubled to between 0.54 and 5.4 microwatts if inverse FWTs are performed to subtract the static targets prior to Doppler analysis. If all 1023 Doppler bins were computed, the total power consumption would be between 0.27 and 2.7 milliwatts. For a target average battery consumption of 0.5 mW, this indicates that it might not be possible to search all 1023 Doppler bins all the time, hence the concept of "on demand Doppler". The trigger for an on-demand Doppler search can be derived by monitoring the total energy in the residual signal samples after subtracting all 192 stationary target-related values. If the residual energy suddenly rises by, for example, 2 sigma of the recently observed mean noise value per bin, that can be taken as the cue to perform a Doppler search. The Doppler search, once a moving target has been found, can be reduced to searching values around previously observed Doppler shifts until those signals disappear, and while they are present, they may be also be subtracted to obtain a further residual which may be searched for further Doppler values if the residual energy indicates.

For very high Doppler shifts, an issue that arises is that the target may shift from one range bin to another progressively over a half-second scan. Using a 1 GB/s chip rate, a shift of one bin over the scan occurs when the target's velocity resolved along the line to the radar is 0.15 meters in 0.5 seconds, which is 0.3 meters/second. If it is desired to track a target with a velocity of up to 2.5 meters per second, it must be anticipated that the target will change from one range bin to an adjacent range bin 8 times during the half-second scan. To track such a high velocity target, accumulation of the signal correlation must also occur along a line that changes from one range bin to another accordingly. FIG. 13 illustrates two such cases. The spots in FIG. 13 represent partial correlation values obtained over a single transmit burst. The range code for which the correlation is done is indicated by R1 to R8 up the vertical axis, while the transmit burst increases from 1 to 1024 along the horizontal axis. Accumulation line (1000) is an appropriate track when the target is moving towards the radar with a velocity of between 0.95 and 1.22 meters/second, resulting in passage through four range bins (+/−0.5) during a half second scan. The partial accumulation should be untwisted by the expected Doppler-induced phase change per transmit burst, and then accumulated along tracks such as line (1000). Note that it is done in parallel for all range assumptions, so there are many such tracks, each beginning at a different range, although of course the object cannot have a range less than a distance to the radar, so that places a constraint on where to start and stop. Track 500-1 is an appropriate accumulation line for an object moving away from the radar with a velocity of between 2.28M/S and 2.59M/S, leading to passage through 8 successive range bins. Again, the partial correlations shall be untwisted for that Doppler and then accumulated along the track. Note that if there is uncertainty about the Doppler frequency or about its constancy over a half-second or about the echo phase stability over the whole scan, then accumulation can be done non-coherently. For example, upon changing range bin, the magnitude of the correlation up to that point can be recorded and then added to the magnitude of the correlation over the succeeding range bin, and so forth. For tracking high-Doppler targets, therefore, there may be a need to perform correlations with all transmit and range codes but only over a fraction of the scan length, such as 128 transmit bursts instead of 1024.

First, coherent accumulation of target echoes over the whole scan when the target moves successively from one range bin to the next due to its Doppler-causing velocity is explained with the help of FIG. 15. A sequence of transmit bursts 400-1 to 400-1203 is received in receive periods 500-1 to 500-1023 as illustrated also in FIG. 5, and in each burst number k, a set of complex receive samples S1(k) to S100(k) is collected and A-to-D converted. If the Doppler shift were less than 0.3 meters/second, the target would remain more or less in the same range bin over the entire 0.5 second scan and thus correlation for the earliest target echo would submit samples S1(1) to S1(1023) to a 1024-point FWT, after re-indexing as described above to obtain correlation with shifts of an M-sequence instead of with Walsh-Hadamard codes. If however, after for example, 128 receive periods, the target has moved away from the radar by one bit period, for receive periods 129 to 256, it is now receive samples S2(129) to S2(256) that need to be substituted for S1(129) to S1(256). Likewise, if after another 128 receive periods, and the target had moved one more range bin distant, it is S3(257) to S3(384) that are applied to the FWT inputs instead of S1(257) to S1(384). Thus, by selecting blocks of progressively delayed receive samples to account for a receding target, the range bin shift is accounted for in the echo accumulation. The rate of range bin shift is proportional to modulation chip rate and velocity while the rate of Doppler phase change is proportional to carrier-frequency and velocity. The Doppler-induced phase slope over the samples is removed as indicated above by de-twisting the received samples in phase. Note that when using GSM-GMSK or GSM-OQPSK, as defined in more detail below, there is an additional 90 degrees phase correction per bin shift that has to be applied to the samples due to a shift of the GSM derotation with respect to the GSM prerotation. Of course, the range bin shift may occur at intervals of less than or more than 128 receive periods, but any shift interval may be accommodated as described above. When the Doppler shift to be searched for is set, and the received sample sets detwisted with a progressive phase shift corresponding to that Doppler, then at the same time the number of receive periods between successive range-bin shifts can be determined from the Doppler shift to ensure that the same target echo is being accumulated during the entire scan even though it moves through several different range bins.

If the target is instead moving towards the radar, the bin shift simply needs to occur in reverse, that is, samples S8(1) to S8(128) from receive period 1 would be accumulated to S7(129) to S7(256) and so forth. It was necessary to start accumulation with the bin 7 range units distant in period 500-1, otherwise the moving target's distance would reach the radar in less than half a second. Thus, it has been shown how the whole FWT may still be used to compute all range correlations for all transmitters efficiently in a total of 100 FWT passes per scan even when the target moves through several different range bins during the scan period. This was made possible by the inventive placement of M-sequence code bits in successive transmit bursts.

If, due to radar target glinting, non-constant Doppler due to target acceleration or deceleration, phase noise or other effect, a coherent correlation over a long time period would be ineffective, then coherent correlation over shorter code segments should be employed followed by a non-coherent combination of multiple ones of the shorter correlations. It will now be described how a 1024-point FWT engine can be simply adapted to perform multiple shorter correlations with the help of FIG. 15.

FIG. 15 illustrates a modification of the FWT structure disclosed above to provide for flexibility in the choice between it performing one long coherent correlation versus performing multiple, short coherent correlations, which are then combined noncoherently. The example in FIG. 15 is an 8-point FWT for simplicity. An input sample vector X=xo x1 x2 x3 x4 x5 x6 x7 is to be multiplied by the extended m-sequence matrix (3000). The m-sequence matrix has been extended by appending both a row and a column of zeros. The first sample x0 is a dummy sample, for example a zero value, corresponding to the appended column of 0's. The input vector X is first permuted by re-indexing operation (3002) to obtain a permuted sample vector, such as, s1, s2, s3, s4, s5, s6, s7. This is submitted to the 8-point FWT comprising three levels of butterfly operations, (3003, 3004, 3005) which computes sums and differences of S0 . . . s7 equivalent to multiplication by Walsh Hadamard matrix (3001). In matrices 3000 & 3001, a binary zero indicates multiplication by +1, while a binary 1 indicates multiplication by −1. The resulting eight (8) output values correspond to correlation of the input vector X by rows m0 to m7 of matrix (3000), but in an output-permutation order. The output values can simply be reordered to correspond to multiplication by successive shifts m1, m2, m3, m4, m5, m6, m7 of the m=7, m-sequence 1011100, with m0 being the sum of the input samples, that is, correlation with the all-zeros code.

The intermediate results (q0 . . . q7. q0 and q1) are seen to be correlations of length-4 vectors (s0 s1 s2 s3) and (s4 s5 s6 s7) with the code 0000. Likewise, q2 and q3 are correlations of these two length-4 vectors with code 0101. If q2 and q3 are now extracted from the intermediate stage of the FWT and coherently combined, forming |q2|2+|q3|2, the result is a non-coherent combination of two length-4 correlations instead of their coherent combination to produce m1,X and m4.X by the final stage (3005) of the FWT. Likewise, extracting values from FWT stage (3003) gives four length-2 correlations which can be coherently combined. Thus, it has been illustrated that an FWT engine arranged as in FIG. 15 has the flexibility to produce a full length coherent correlation with each full length code, or two half-length correlations with each possible half-length code, with the half-length correlations then being available to be non-coherently combined, or four quarter-length correlations with each possible quarter length code, and so forth. Indeed, all of the above may be computed at the same time if desired, but, when half-length correlations are computed, it is desirable that the half-length code be a correspondingly shorter m-sequence to preserve orthogonality between all half-length codes, with the input permutation being adjusted accordingly. Likewise, when quarter-length correlations are computed, a correspondingly shorter m-sequence should be used. As described above, the length of the M-sequence needs to be at least equal to the product of the number of transmitters and the number of bits per transmit burst in order to provide a sufficient number of different shifts of the M-sequence to render each range correlation, and for all transmitter codes, nearly mutually orthogonal. Thus, for four (4) transmitters and 48 bits per transmit burst, the shortest M-sequence that can be used is the next highest power of two (2), minus one (1), to 4×48, that is M=255. Thus, the smallest number of transmit bursts over which coherent correlation can be performed is 255. In order to avoid placing too low an upper limit on the Doppler that can be detected, a shorter correlation could be used if either the number of transmitters were reduced or else the number of bits per transmit burst were reduced. For example, with three (3) transmitters and 40 bits per burst, an M=127 sequence could be used, and thus length-127 coherent range correlations could be performed. However, another method to increase the maximum Doppler that can be handled is to reduce the time between bursts. For example, instead of 480 µs between bursts, a train of 255 transmit bursts can be transmitted with only 120 µs between them. A long gap of 255×the remaining 360 µs, that is 91.8 ms, then occurs before the next 255-pulse train is emitted, thus maintaining the same low duty factor in order to keep power consumption down. Such alternative transmit pulse-train formats are compared in FIG. 16.

The waveform at the top of FIG. 16 illustrates the regular format of the 1023-bit transmit pulse per scan that has been described above. The transmit pulse of 48-bits per pulse are designated 402-1, 402-2 . . . 402-1023 as in FIGS. 4 and 5. Following each transmit pulse there is a corresponding receive period of approximately 100 ns designated 500-1, 500-2 . . . 500-1023. Between the end of one receive period and the next transmit pulse there is an idle period. The idle periods are designated 600-1,600-2 . . . 600-1022 and their duration is the exemplary 480 µs, less the 48 ns transmit pulse and less the 100 ns receive period.

The middle waveform of FIG. 16 illustrates use of a 511-bit M-sequence to transmit a train of 511 pulses designated 402-1 to 402-511. The idle period between pulses may now be shortened so that the time between transmit pulses is reduced. There is no limit to how much shorter the time between pulses can be, but if too short, the waveform will be capable of resolving very high Doppler velocities but at the expense of Doppler frequency resolution and resolution of low Doppler frequencies. Therefore, the time between pulses is shortened just sufficiently enough to handle the highest expected Doppler at that time. When using the middle transmit format of FIG. 16, after every 511 transmit pulses, an extra-long gap 400 may occur before the next 511 pulses, so as to keep the duty factor and power consumption constant if required. The gap may be reduced at the expense of power however, if a moving object deserves observation that is more frequent. The lower waveform of FIG. 16 illustrates the use of an M=255 sequence which can also have shorter idle periods between pulses in order to handle higher Doppler. A first train of 255 transmit pulses designated 402-1 to 402-255 is followed, after an extra-long gap if needed, by a second train of 255 pulse designated 402-256 to 402-510. Several length 511-correlations corresponding to the middle waveform of FIG. 16 can be combined non-coherently or coherently and likewise several length 255 correlations corresponding to the bottom waveform can be combined non-coherently or coherently. It might be considered convenient to choose the M-sequence and therefore correlation length together with the time between transmit pulses within a contiguous train of pulses, such that no range bin shift need be implemented during one coherent correlation block. When combining successive coherent correlations non-coherently, however, it can at that point be determined if a range bin shift is needed between one block and the next to ensure that it is the same target echo that is accumulated across blocks. The postulated Doppler used for phase-de-twisting is used to predict when the target moves from one range bin to the next.

The different transmit pulse-train formats of FIG. 16 may be selected according to the prevailing Doppler situation. Thus, it can be useful to have advance notice of the Doppler frequencies present in the echo signals before deciding on coherent or non-coherent accumulation, and in order to reduce the number of Doppler frequencies that have be tested from the full number M (or more) to a reduced number, in order to conserve battery power. It may be noticed from FIG. 15 that the row of zeros appended to the matrix of M-sequence shifts to allow use of an FWT for efficient correlation is actually another code that is near orthogonal to the M-sequence shifts. The set of codes formed by all M-sequence shifts and a row of zeros is called the Simplex set. If the all zeros code were used to modulate a transmitter, the transmitter would effectively be transmitting CW. Echoes of such a CW transmission will be Doppler shifted, but no code correlation is required, the signal simply being submitted to an FFT to resolve the different Doppler shifts. One method to process echoes of the CW signal is add up all 100 receive samples corresponding to each of the M transmit bursts and then to submit the M sums to an FFT. The largest FFT spectral lines can then be taken as the Doppler shifts to search for. Based on the Doppler shifts found, one or other of the waveforms illustrated in FIG. 16 can then be selected to best resolve the moving targets. In this way, on a second-to-second basis, the transmit format can be varied according to the number and speed of targets detected. Thus, in one implementation one transmitter, or an additional transmitter, can be dedicated to transmitting the all-zeros code. Note that when using the GSM precoding which is further described below, the transmitted signal using the all zeros code is actually displaced from the carrier center frequency by ¼ the chiprate. The receiver pre-decoding compensates for this and gives the additional benefit that DC offset in the receiver downconverters is shifted up to ¼ the chiprate and is thus well beyond the highest Doppler frequency.

Beamforming comprises combining the accumulated correlations corresponding to the same range but obtained from different ones of the n receivers and m transmitters by multiplication of the nm like-range values with an nm×nm complex beamforming matrix. For example, for 4 transmitters and 4 receivers, this matrix would be of size 16×16. For 100 ranges and 16 boresights, 1600 values result. It can be decided that only values of, for example, 6 dB or more above the average noise floor are real targets, or at least that only those are strong enough to possibly need to be nulled-out before searching for weaker static targets or moving targets. In this case, the procedure for nulling-out the targets deemed detected could be by setting all the rest of the 1600 values to zero, performing an inverse beamforming on the remainder to determine a signal representing only the detected targets, and subtracting that from the FWT outputs. The amount to be subtracted is apportioned between the FWTs that contributed to each value, subtracted, and then inverse FWTs performed to obtain the residuals for further analysis. The benefit of determining what to subtract after beamforming is that less energy of as-yet undetected targets is lost because the energy of the detected targets is subtracted only from that proportion of the signals arriving from the direction in which the detected targets lie. The above describes simultaneous interference subtraction in code and direction-of-arrival space for separating communications signals using CDMA conveying data from transmitter locations to a receiver location. The technique is adapted to a different application herein, namely, separating echoes of transmitters, received by co-located receivers, which echoes are received from different distances and directions. Moreover, in pulse-digital MIMO radar, the transmitter is not transmitting at the time the receiver is receiving, in contrast to the communications application.

It can also be chosen whether to perform beamforming before or after a Doppler search. If a transmitter is dedicated to transmit the all zeros code in order to provide a preview of the Doppler frequencies, the multiple receivers can be used to provide some degree of beamforming to enable the moving targets to be approximately located in direction-of-arrival space, as well as enhancing the signal to noise ratio at the input of the Doppler FFTs.

If the targets are exactly stationary to a fraction of a wavelength stability (e.g. of the order of 0.5 mm in the 60 GHz region), the range bin results on successive scans can be coherently combined to more accurately determine mean values.

Details of the transmitter and receiver implementations will now be described with the aid of FIGS. 8-14.

FIG. 8 provides a synopsis of the characteristics of different candidate modulations. Binary phase shift keying (BPSK) modulation transmits a signal with phase zero (value+1) for a binary 0 and phase 180 degrees (value −1) for a binary 1 (or vice versa). The transition from one to the other most directly goes through the origin, which implies amplitude modulation. If it is desired to have a gradual transition to contain the spectrum, the transmit PA must deal with the intermediate values and so must be linear rather than hard-limiting. The occupied bandwidth of BPSK is at least equal to the bitrate, as the main lobe width is +/−B/2, where B is the bitrate. For 1 GB/s therefore, the occupied bandwidth is at least 1 GHz, and only 500 MHz is available in the 60 GHz band. BPSK could be used at 500 MB/s if the number of bits per burst were reduced from 48 to 24.

Quadrature phase shift keying (QPSK) modulation, on the other hand, places half the bit stream on the I-phase and the other half on the Q-phase, thus halving the bandwidth compared to BPSK of the same bitrate. Grey coding is used in communication applications in which the four possible phases that result of 45, 135, 225, and 315 degrees represent bit-pairs 00, 01, 11, and 10 respectively, so that pairs that differ by two bits are more widely separated in complex signal space than bit pairs differing in one bit only, thereby minimizing bit error rate. Grey coding is not necessarily of any interest to radar, however.

QPSK also has one-in-four transitions to a diametrically opposite phase, so a linear PA may be needed if shaping to control the spectrum is needed. QPSK also requires codes that are meant to be orthogonal with any relative shift or phase to be designed as complex codes for which there is less knowledge in the art than for real-valued codes.

In Offset quadrature phase shift keying (OQPSK) modulation, like QPSK, half of the bitstream is placed on the I-phase and the other half on the Q-phase, but the transitions are staggered so that only an I-bit or a Q-bit changes to a new value at any one time. This causes the signal vector to rotate either clockwise 90 degrees or anticlockwise 90 degrees for each new bit and transitions to diametrically opposite points are avoided. The 90-degree transitions can be made while constraining the signal vector to lie on the unit circle, thus allowing constant envelope power amplifiers to be used. When odd bits b1, b3, b5 . . . are placed on the I-phase and even bits b2, b4, b6 . . . are placed on the Q-phase, correlation with the original code b1, b2, b3, b4 . . . does not give the results computed from just correlating the code with itself at baseband, as the even bits have been multiplied by j=root(−1). One could consider rotating the samples representing Q-bits by 90 degrees before correlation, but that only works for one assumption of the timing as to which are the I-bits and which are the Q-bits. Without such synchronization, correlation has to be done with the code b1, −jb2, b3, −jb4 . . . which is the complex conjugate of the transmitted pattern. The autocorrelation function is not the autocorrelation function of the code b1, b2, b3, b4 . . . . It will be shown that this is rectified by the use of GSM-GMSK modulation.

Minimum-shift keying (MSK) modulation is when the OQPSK transitions are made at a constant speed around the unit circle. Rate of change of phase is equal to frequency shift, so to change the phase by 90 degrees smoothly over a bit period, the frequency shift is plus or minus ¼ of the bit rate. Deviating the frequency by +/−¼, the bitrate to represent a "1" or a "0" is considered to be frequency-shift keying (FSK) modulation but with a minimum frequency deviation, hence the term Minimum Shift Keying or MSK. MSK can be decoded coherently by observing that the phase always ends up at either 0, 90, 180 to 270 degrees, and so by determining the absolute phase at the end of a bit period, the same bit-pair information as with QPSK or OQPSK is decoded, one bit of a pair being decoded at each bit interval in the case of MSK and OQPSK while both bits of the pair are decoded at once at 2-bit intervals with QPSK.

If even smoother transitions between constellation points are required in order to obtain spectral tails lower than those of MSK, then the FM waveform, which with MSK is a square wave frequency change with amplitude+/−Bitrate/4, can be further filtered. It was discovered that for some mathematically coincidental reason, Gaussian filtering leads to the best spectral containment for a specified amount of signal loss due to rounding, also known as intersymbol interference. Gaussian-filtered MSK modulation is abbreviated to GMSK modulation. A nuance of GMSK is that the modulation waveform is not obtained by filtering a square-wave MSK frequency modulation waveform, but rather by applying+/−bit impulses to a Gaussian filter. MSK would result if impulses were applied to a sin(x)/x filter, so GMSK is equivalent to replacing the sin(x)/x filtering intrinsic to MSK with Gaussian filtering. Therefore, GMSK does not reduce to MSK as the Gaussian cut-off frequency is raised but rather tends to OQPSK.

GSM-GMSK refers to a special form of GMSK modulation which was adopted for GSM, the first digital cellphone system, and uses a pre-encoding of the bitstream at the transmitter and a pre-decoding operation at the receiver to undo the precoding such that the receiver output bits all lie in a single plane of the complex signal space. The result is that correlation of the pre-decoded receiver output with the bit pattern b1, b2, b3 . . . gives the same autocorrelation properties as when the baseband code autocorrelation properties are computed. A search for complex codes with prescribed autocorrelation properties is thus avoided. This may also be used in OQPSK, which is the same as GMSK with fast transitions between constellation points. The precoding involves multiplicatively placing each successive bit on a signal vector that rotates in the continuous sequence 1, j, −1, −j, 1, j, −1−j, 1, j . . .

Thus, b1 gives 1 for a binary zero and −1 for a binary 1; b2 gives j for a binary zero and −j for a binary 1; b3 gives −1 for a binary 0 and +1 for a binary 1, and b4 gives −j for a binary zero and j for a binary 1, while b5 is back to being represented by +1 for a zero and −1 for a 1, and the sequence repeats. For GSM-GMSK (or OQPSK) the receiver collects and digitizes complex samples of the received signal, but then applies a phase rotation to the received samples which is the reverse of that used at the transmitter. So, a first sample may remain unrotated; the next sample is multiplied by −j, that is rotated by −90 degrees which means swapping real and imaginary parts and negating the new imaginary part. The third sample is rotated by −180 degrees, which means negating both real and imaginary parts, while the fourth sample is rotated by −270=+90 degrees, which means swapping real and imaginary parts and negating the new real value. It will be realized that this reproduces the original real modulating stream b1, b2, b3 . . . but with an unknown phase and amplitude due to the propagation path length and target echo characteristics. It is the purpose of correlation, which may now be done with the real waveform b1, b2, b3, b4, to determine the unknown echo phase and amplitude. The GSM precoding simplifies the correlation by requiring only correlation of the real pattern separately with the real and imaginary signal components after the pre-decoding rotation, which is half the effort compared with the full complex correlation that would have had to have been performed otherwise.

FIG. 11 shows a quadrature modulator for modulating a transmitter with M-sequence-derived codes according to the foregoing description. Each transmitter (except for a transmitter transmitting the all zeros code) has a modulator according to FIG. 11. The modulator of FIG. 11 is configured to generate GSM-OQPSK type modulation but it is simple to remove the GSM precoding if so desired. Starting at the left-hand side of FIG. 11, a 10-bit feedback shift register (507) can generate any M sequence up to length 1023 depending on the selection of feedback taps. Tap selector (508) may have a control input (not shown) to determine which of the 10 shift register to select to be exclusive OR-ed together and fed back to the input. The shift register (507) is reset to a start state at the beginning of a scan. Since different transmitters shall use different shifts of the code, it is simple to determine which shift each transmitter uses by appropriate selection of the start state. It is anticipated that an overall control processor would supply the start states to each shift register (507) in order to create the desired sequence shifts of at least 48 bits between each transmitter. The control processor could also set the taps to determine the length of the sequence to be 1023, 511, 255, etc, and to select different sequences for different radars to minimize mutual interference. After initialization prior to the start of a scan, shift registers (507) and shift registers (505) are clocked 48 times to fill shift register (505) with 48 successive bits of the sequence.

Shift registers (505) output all 48 bits, but with every alternate even bit complemented and every alternate odd bit complemented. This implements the GSM precoding. During a transmit burst the 24 even and 24 odd outputs are scanned at the half the chip rate with a moving tap or 24-way selector switch, the selector switch for the I modulator (odd bits) and the Q-modulator (even bits) moving alternately. Thus, the output sequence produced is as follows:

(1) Bit Q48 is applied to low pass filter (503) and bit Q47 is applied to low pass filter (504)

(2) Bit Q46 is selected to be applied to LPF (503) after 2 nS (3) Bit Q45 is selected to be applied to LPF (504) after 1 nS (4) Bit Q44 is selected to be applied to LPF (503) after 1 nS (5) Bit Q43 is selected to be applied to LPF (504) after 1 nS and so forth, changing the selection of even bits and odd bits alternately until bit Q1 has been selected, at which point the transmit burst will stop after a final 1 nS. The above procedure generates GSM precoded, filtered OQPSK at a bitrate of 1 Gbit/sec, although I and Q only change at the rate of 500 Mbits/second each, but alternately. The transmission bandwidth is therefore of the order of 500 MHz.

Low pass filters (503,504) are only needed if unfiltered OQPSK has spectral tails that are not in accordance with applicable regulations. In any case the bandwidth of filters (503,504) is best made as wide as possible while meeting the spectral mask required by regulation.

Low pass filters (503,504) preferably output balanced signals to drive balanced modulators (501,502). If necessary, low pass filters (5034,504) can be completely balanced structures having balanced inputs also, obtained by selecting not only Q-outputs from shift registers (505) but also their complements. The complements could be produced by using inverters or additional 24-way selector switches to select the complementary outputs of shift register (505).

Balanced modulators (501,502) are preferably Gilbert-type cells constructed in CMOS. Exemplary modulator embodiments in a class-B biased mode to obtain higher conversion efficiency of DC battery power to modulated RF output power. The capacitance of the RF output from the Gilbert cell transistors must be resonated with an inductor (not shown) in order to achieve high efficiency at millimeter wave frequencies. The inductor can be the primary of an on-chip transformer coupling the modulator output to its respective PA.

The combination of circuits illustrated in FIG. 11 can implement all of the M-sequence-based coding methods described above. Each modulator as in FIG. 11 is followed by a power amplifier. The power amplifier may be one, two or several cascaded stages of amplification in order to obtain the desired power output. Typically, an output power of the order of +10 dBm (10 mW) to +20 dBm (100 mW) would be used. The modulator of FIG. 11 may be capable of achieving 0dBm output, so the P.A. will need between 10 and 20 dB of power gain. At 60-100 GHz, it is a struggle to get a stage gain of 10 dB, therefore for 100 mW output the P.A. would be at least two stages.

FIG. 9 depicts a 2-stage, transformer coupled, push-pull power amplifier with on-chip tuning using the transformer inductance.

An input transformer consisting of a primary L1 and a secondary L2 is formed on chip as single turn loops overlapping on adjacent metallization layers. Preferably the two top layers of metallization are used with no underlying metallization in order to put maximum thickness of insulation layers between the transformer and the lossy silicon substrate. The input transformer inductance is selected by choosing the turn area to resonate the output drain capacitance of the modulator of FIG. 11 and the input gate capacitance of the first amplifier stage using transistors Q1 and Q2. The advantage of such transformer coupling is that the modulator Vcc can be applied to the primary center tap of L1 and the amplifier gate bias voltage can be independently chosen and applied to the secondary center tap of L2.

Likewise L3,L4 forms a transformer coupling the output of the first amplifier stage (Q1,Q2) to the second amplifier transistor input, the gates of Q3 and Q4. The transformer inductance is once again chosen to resonate the output capacitance of stage 1 and the input capacitance of stage 2. The final transformer formed with L5 and L6 provides a BALUN function (balanced to unbalanced) converting the push pull transistor output to a single-ended output relative to ground. The single output is brought off chip to an external antenna through a ball-bond, the ball bond being surrounded on four sides with grounded ball bonds to form a pseudo-coaxial connection. Capacitors C1, C2, C3 and C4 perform cross-neutralization of the drain-gate capacitance of their respective transistors to eliminate Miller effect.

Unfortunately, the Q of output tank circuit L5,L6 that can be achieved by on-chip inductors is low, certainly less than 30, and so significant loss and thus efficiency drop occurs due to the on-chip output transformer, as well as the loss of the ball-bond pseudo-coaxial connection, which is lossy partly because the grounds surrounding the signal bond do not form a continuous coaxial circle. Therefore, to increase efficiency, it is desired either to avoid bringing the output off chip through ball bonds at all, or to bring the transistor output drains off chip to external tuning and matching, where it can be made in a lower loss technology. On chip structures that launch the signal into millimeter-wave plastic waveguide may also be considered instead of trying to make a pseudo-coaxial connection with ball-bonds.

The first method to improve efficiency that may be considered is to avoid bring the millimeter wave signal off chip by using on-chip antennas. CMOS technology allows manufacture of a long, thin, rectangular chip having the same area for circuitry as a more square chip. The maximum length of the chip is however still limited to about 1. centimeters. The packing of a number of on-chip dipole antennas within this length and separated by half a wavelength is shown in FIG. 17.

In FIG. 17, a 15 mm by 1 mm CMOS chip 1700 comprising all of the circuitry described herein for realizing a Pulse-Digital MIMO radar has in addition, deposited on an outer metal layer, six dipole antennas 1702 spaced 2.5 mm apart center-to-center, which is a half wavelength at 60 GHz. To provide a gap between the dipoles, which would normally take up the whole half-wavelength, they may be foreshortened by tapering them in the shape of a bow-tie, as shown. The antennas 1702 are spaced between ⅛ and ¼ lambda from underlying metal, taking into account the relative permittivity of the intervening insulation. A layer of high permittivity material may be employed to reduce the stand-off distance. For example, in air the standoff distance would be between 0.625 and 1.25 mm. Use of a material with relative permittivity equal to 7 reduces this to 0.47 mm, and also reduces the size of the antenna by the same factor. The antennas may then be re-orientated longitudinally so as to align with the E-field of a waveguide for a direct chip-to waveguide transition.

The six antennas 1702 may be allocated to transmitters or receivers, choosing allocations that provide the best that provide the best virtual array for angular discrimination. The virtual antennas of the virtual array have virtual locations obtained by convolving the receive antenna spacing pattern with the transmit antenna spacing pattern. Two arrangements which provide good virtual antenna virtual locations are
  Rx Tx Tx Tx Tx Rx or
  Tx Rx Rx Rx Rx Tx Whether four transmitters and two receivers gives lower power consumption than two transmitters and four receivers is not clear until an actual design has been fully simulated. With four transmitters and two receivers, the two receivers must each correlate with four transmitter codes; with two transmitters and four receivers, the four receivers must each correlate with two transmitter codes. Therefore, in both cases, eight sets of correlations are performed by the receivers. Also, in both cases, the link budget for detecting weak targets in noise are the same. So, the question remains to be answered for a particular design whether the RF circuitry for a receiver operating for 100 ns takes more or less energy than that of a transmitter operating for 48 ns.

Another arrangement comprising 3 transmitters and 3 receivers such as Rx Rx Tx Rx Tx Tx provides nine virtual receivers instead of the eight above, and thus has a slight link budget advantage. The on-chip antennas 1702 illustrated in FIG. 17 may be direct radiators, but being a linear array having directivity only in one plane, the directivity in the other plane may be enhanced by placing the chip at the center of a reflector, curved in the second plane at least, as shown in FIG. 14. In FIG. 14, the chip (4001) of FIG. 17 is placed to illuminate a curved reflector (4000). The reflector focuses the beam in the elevation plane to provide gain in that plane over and over the elevation directivity provided by the on-chip bow-tie antennas.

FIG. 18 shows the use of on-chip radiating structures to form a direct chip-to-waveguide interface with a slotted waveguide array antenna 5000, which is an alternative method of obtaining directivity in the elevation plane. The silicon chip has, in addition to antennas on the active side of the chip, a number of ball-bonds for connecting with other than millimeter-wave I/O. In this lowest-power application, the number of I/O's is minimized so as not to encroach on the space for waveguide launchers or antennas. The I/O's comprise only ball bonds for DC power, the connection of external frequency reference crystals and high-speed data input/output, and may be located at the 1 mm wide ends of the chip. The die 1700 of FIG. 17 is attached to printed circuit board (5001) which makes contact with the ball bonds and PCB tracks connect the chip with the outside world, whatever that may be, e.g. a Wi-Fi chip or human interface such as LEDs, acoustic alarm device, or the like. The printed circuit board is slotted to allow slotted waveguide antenna (5000) to be placed through the PCB for direct interfacing with the on-chip waveguide launchers. The waveguide launchers are on-chip antennas orientated so that their E-field aligns with the waveguide E-field.

The use of on-chip antennas or a direct chip-to-waveguide interface avoids the issue of bringing power amplifier signals off chip. In the above, it was disclosed that on-chip push-pull power amplifiers (PA), using N-type MOSFETs, could be used with an on chip BALUN to convert the push-pull PA output to a single-ended output for exiting the chip through a ball bond surrounded by ground ball to form a pseudo coaxial connection. Unfortunately, the on-chip BALUN, which is formed by using a secondary winding on the PA tank circuit, is lossy due to the limited Q factor of the on-chip tank circuit. Therefore, it is desirable to find solutions that place at least some of the PA transistor output susceptance nulling off-chip where inductive Q-factors may be higher.

Bringing the N-type transistor drains off-chip entails a risk of static damage. Conventional static protection safeguards are incompatible with efficient millimeter wave power transfer. The static damage risk pertains mainly to positive spikes which would exceed the drain-source or drain-gate breakdown voltage, but some immunity to negative spikes is conferred by the intrinsic. Drain-substrate diodes that are an inevitable feature of bulk CMOC technology. For P-type transistors, the drain-substrate diodes confer some immunity against positive spikes. Therefore, it is disclosed that a static-protected PA may be constructed as a combination of N-type and P-type transistors in an H bridge configuration, as illustrated in FIG. 10.

FIG. 10 illustrates two P-type MOSFETs labeled Q1 and Q2 connected drain-to-drain with two N-type transistors Q2 and Q3 to form a complementary H-bridge. One P-type drain connected to its complementary N-type drain forms one of the two push pull outputs, while the other connected drains form the second of the push-pull outputs. Each transistor comprises a drain-substrate diode which is not explicitly shown in FIG. 10, but it may be inferred that the drain substrate diodes of the P-types have their cathodes effectively connected to the Vcc power input so that they are normally back-biased while the N-type transistors' intrinsic drain-substrate diode anodes are effectively connected to ground. The combination of the P-type and N-type intrinsic diodes therefore effectively clamps a positive going static spike on either of the push-pull outputs to just over Vcc while clamping a negative going static spike to just below ground.

Obtaining significant power gain at very high frequencies requires neutralization of the drain-gate feedback capacitances to combat the Miller effect. Capacitor C1 in FIG. 10 is chosen to be equal to the drain-gate capacitance of Q1 and is connected to the antiphase drain. Likewise, capacitors C2, C3, and C4 neutralize the drain-gate capacitances of their respective transistors. C5 is a power supply decoupling capacitor while capacitors C6 and C7 decouple respective gate bias supplies. Inductor L1 is a spiral winding (in one embodiment, no more than 1 or 2 turns), on the input coupling transformer, which is formed from the metallization layers available in the CMOS process. L2 is another winding on the same transformer using a different layer. The primary of the transformer may be yet another layer and is the tank circuit of the driver stage. The inductance values are chosen to resonate with total capacitance at the desired operating frequency.

The gate bias voltages may be chosen separately for the P- and N-type transistors to balance their performance and optimize efficiency. There may even be feedback from the mean common mode output voltage to the gate bias voltages to achieve auto-balance, as if the mean common mode output voltage is mid-rail, it is clear that the P-types and N-types must be passing equal currents in the mean. The feedback time constant must be carefully examined in the light of the short (48 ns) transmit pulse and it is likely that the time constant would be chosen to be longer than several of the 480 us times between pulses and the feedback gated to respond only to the 48 ns periods that the PA was on, thereby setting the bias in dependence on the mean over a large number of transmit pulses. If it is possible to operate the P-types with zero gate bias, then C7 is omitted and the center of L1 connected directly to Vcc. L1 may then be the primary of the input transformer and the tank circuit of an N-type driver stage. Conversely, if the N-types can be operated at zero gate bias, then C6 is omitted, the center tap of L2 is connected to ground, and L2 can be the primary of the input coupling transformer and the tank circuit of a P-type driver stage.

FIG. 12 illustrates an exemplary direct-conversion receiver suitable for the invention. Antennas (7500) are associated to a respective receiver in the case where all receive antennas are required to receive simultaneously. In some implementations, one or more receivers may have alternative antennas assigned to it that are connected to different pre-amplifiers 7501. By enabling or disabling a preamplifier, the alternative antennas may be selected for the receiver at different times, thus increasing the number of virtual antennas available for beamforming and increasing thereby the spatial resolution of targets. The selected pre-amplifier output drives balanced mixers (7502), which are typically Gilbert cells. The Gilbert cells mix the received signal from preamplifier (7501) with 0 and 90 degree relative phased signals from injection-locked quadrature oscillator (6005) which is further described later in connection with the local oscillator chain design. The Gilbert cell outputs are I and Q baseband signals plus noise, and a DC offset that is often much larger than the signal and must be removed so as not to saturate following baseband amplifiers. Module 7600 contains the baseband amplifiers and may comprise a first stage of DC removal. A DC removal module 7601 can comprise closing switches (7602) briefly (for may be 10 ns) after transmission has ceased to charge capacitors 7601 to the prevailing DC offset from mixers (7502). Thereafter, the switch 7602 is opened and the capacitors hold the charge while driving the following high-input impedance amplifier. The DC offset so removed is not accurate, but is limited to the magnitude of the signal or noise being received at the moment of closure, thus keeping the received signal thereafter within the dynamic range of A-to-D converters 7503.

After analog to digital conversion in the A-to-D converters 7503, if the GSM precoding is employed, it is removed by digital de-rotation in module 7504. The derotation performed by module 7504 comprises applying a systematic and progressive phase rotation in steps of 90 degrees to successive samples in such a direction as to remove the progressive 90 degree rotation applied in the transmit modulator of FIG. 11, thus recovering the un-rotated bit sequence (b48, b47, b46 . . . b3, b2, b1) of the transmit burst apart from the unknown echo phase and amplitude. Because a more delayed echo was rotated with an earlier part of the progressive phase than a less delayed echo, but both are removed with the same derotation in module 7504, there is also a range-bin dependent rotation of one or more multiples of 90 degrees that can be ignored except when trying to accumulate the echo of a fast-moving target as it shifts between successive range bins. In the latter case, when target echo accumulation crosses a range-bin boundary, the previous accumulation must be rotated +/−90 degrees in order to remain aligned with the signal phase from the new range correlation data.

Continuing to place emphasis on the low-power, battery operated implementation of the invention, the issue of frequency generation and the local oscillator chain will now be described.

An exemplary technique for minimizing power consumption is to operate the radio-frequency circuits at a low duty factor. The system described above operates each transmitter for 48 ns, either at the same time or at different times, while each receiver operates for 100 ns. Since to obtain the MIMO advantage each receiver must receive and decode each transmitter, if the transmitters are not operated at the same time, the receiver radio circuits must be active during all transmitter periods. The local oscillator chain must generate the transmit frequency and the receive local oscillator signals during both transmit and receive periods and must produce a stable, accurate frequency. For the low-power, short range radar, echo returns are received within 100 ns of the end of transmission, therefore, the requirement for local oscillator phase noise is that the phase difference between the phase transmitted 100 ns ago and the phase of the local oscillator during the receive period should have a small variance. This is not so difficult as for the long-range radar case, where target echoes are received 2 μs delayed, and therefore the phase must be stable over 2 μs. The short-range case is thus of the order of 20 times less sensitive to phase noise than the long-range case. However, the local oscillator start-up time after a power down period represents wasted energy and must be minimized in the low-power radar case. The invention in that case comprises switching off all radio circuitry including the accurate reference oscillator crystal and maintaining an awareness of elapsed time using only a 32 KHz "watch crystal" which can run at current in the microamp region. The watch crystal drives a low power CMOS divider chain that is programmed to wake up the radio circuits when required.

At a predetermined timer-chain count, parts of the radar circuitry begin to be powered up. The longest start-up time is required by the high-frequency reference. This can be for example a 100-200 MHz crystal oscillator or a 1 to 2 GHz SAW oscillator. The high-frequency reference oscillator provides the transmit bit rate in the 125 MHz to 2 GHz region depending on the application, and the frequency is multiplied using either frequency multipliers or frequency synthesizer loops or a combination thereof to provide the millimeter wave local oscillator signal in the 30-100 GHz region for transmit or receive. Every stage of the local oscillator chain may be powered up at an optimum time in a sequence to save the maximum possible amount of battery power while minimizing the settling time to a stable and accurate output frequency. After the local oscillator chain has stabilized, the code modulator(s) and power amplifier(s) are powered up each to transmit a burst of code-modulated millimeter wave carrier signal. After each transmit burst has finished, the timing chain continues by powering off the transmitter(s) and powering up the receiver(s) to receive and digitize samples of the echo returns from targets. The timing chain may then power down the receiver(s) and the local oscillator and reference oscillator chain for a predetermined period before repeating the sequence.

After the high-frequency reference oscillator is powered up, timing may optionally be controlled by the more accurate high-frequency oscillator rather than the less accurate watch crystal if necessary. Also if necessary to obtain improved timing accuracy for the power-up-transmit, receive-power-down sequence, the watch crystal frequency can be calibrated to the more accurate high-frequency reference oscillator every time the latter is woken up, and the calibration result used to define required timing periods as a first number of cycles of the watch crystal plus a second number of cycles of the high-frequency reference oscillator, thus providing a timing resolution and accuracy much better than one cycle of the watch crystal.

FIG. 19 shows a local oscillator chain based on frequency multipliers. A 127.604166 MHz crystal oscillator (6000) drives a chain of push-push frequency doublers (6001, 6002 . . . 6003) to reach 4083.33 MHz. A suitable I/O bitrate of 510.41666 MHz is extracted from the intermediate output of doubler (6002). The 40,833.33 MHz oscillation from doubler (6003) drives an injection-locked quadrature frequency tripler (6004) which produces an output of 12.25 GHz and at least 0 and 90 degree phased signals, and may be all four phases 0,90,180 and 270. The quadrature outputs of tripler (6004) are in turn used to injection lock a quadrature oscillator (6005) running at five times the frequency to produce quadrature local oscillator signals at 61.25 GHz for driving the quadrature modulators of the transmitters or the zero-IF quadrature downconverters of the receivers. Each transmitter and each receiver may have a separate 61.25 GHz injection locked quadrature oscillator because it is easier to distribute the 12.25 GHz injection locking signal around the chip with low losses to where it is needed than to distribute the 61.25 GHz signal.

Each stage of the local oscillator-multiplier chain of FIG. 19 has an input for a start impulse provided by the watch-crystal timer chain. As described above, the start impulse may be applied at intervals of 480 μs in order to wake up the radio circuits for a 48 ns transmit pulse followed by a 100 ns receive period. In order to minimize the startup time of the local oscillator chain, the 127.604166 MHz crystal oscillator (6000) might be power up first and allowed to stabilize for a few tens of cycles before powering up the multipliers. To minimize the multiplier chain settling time, it should be arranged that the start impulse excites a transient in each stage of such an oscillation phase as is required at that time, and obviously avoiding the reverse as far as possible.

An alternative to the local oscillator-multiplier chain of FIG. 19 is a high-speed phase-locked loop, as shown in FIG. 20. To ensure the fast lock-up time, the synthesizer loop must have as wide a bandwidth as possible, which requires a high phase-comparison frequency. Also, to minimize start-up time, a Surface Acoustic Wave resonator is employed directly at 510 MHz instead of a lower frequency crystal. SAW oscillator (7000) would receive the power-up impulse from the watch-crystal timer chain although the input is not shown. A quadrature voltage-controlled oscillator (7002) is now used to generate 12.25 GHz. This is divided down by 24 in digital divider (7003) to the SAW frequency and compared therewith in phase detector (7001). The output of phase detector 7001 is fed to loop filter (7004) comprising an integrator and a damping zero with frequency response of the form $(1+2\zeta s/wn)/sCint$ where $\zeta$ is the damping factor, preferably equal to unity, and wn is the loop natural frequency. The loop natural frequency should not be higher than about 1% of the phase comparison frequency to give the loop filter a chance of strongly suppressing the comparison frequency to prevent them reaching QVCO 7002. Nevertheless, this allows a 5 MHz loop bandwidth which would yield about 400 ns lock time. Simulations showed it was advantageous to reset variable divider (7003) to zero synchronously with the SAW oscillator upon restart in order to minimize lock time by starting with an initial zero phase error. Phase detector 7001 at lower frequencies is typically a coincidence detector using two flip-flops, that provides both frequency error and phase error information it may be difficult to make a coincidence detector operate at 500 MHz, but a simpler balanced mixer or XOR gate can be used alternatively, as with such a wide loop bandwidth the loop will never slip cycles and thus have no need of frequency error information. If necessary to ensure the latter, a two-speed loop can be employed that widens the loop bandwidth to perhaps 10 MHz for the first 100 ns and then switches to the normal loop bandwidth for the rest of the settling time.

Attention is now turned to the long-range, driver-assistance radar application of the invention. The differences in the detailed design are due to their being many more range bins and a very much higher Doppler to deal with, but with much relaxed restrictions on power consumption due to operation from the alternator-charged vehicle battery. Target performance of a driver-assistance radar is to be able to recognize targets at a distance of 300 meters, representing a go-return propagation path delay of 2 μs. For long-range targets, the range resolution can be relaxed as compared to shorter range targets, and the radar may operate in one of multiple available bitrate modes at different times in order to provide both long range, low range resolution target information for some instants and short range, high range resolution at other instants.

of orthogonal or near-orthogonal codes between different transmitters and different range bins, based on 12 transmitters.

| Max range | Tx and Rx duration | No. of range bins | Range resolution | I-Q bitrate | Scan length | Max target velocity |
|---|---|---|---|---|---|---|
| 300 m | 2 uS | 500 | 0.6 m | 250 MB/S | 8192 × 4 uS | 30 km/hr |
| 150 m | 1 uS | 500 | 0.3 m | 500 MB/S | 8192 × 2 uS | 60 km/hr |
| 75 m | 0.5 uS | 500 | 0.15 m | 1 GB/S | 8192 × 1 uS | 120 km/hr |

In order to make use of the inventive coding described above, it was explained that the product of the number range bins with the number of transmitters shall be less than the number of bursts per scan in order that there be a sufficient number of available orthogonal or near orthogonal codes. For example, suppose the range resolution required is 0.6 meters at 300 meters; that represents a round trip delay resolution of 1.2 meters or 4 ns. Therefore, a suitable I/O bit rate would be 250 MB/s. In the 2 μs receive period, there are thus 500 range bins. If 12 transmitters are employed, the total requirement for available orthogonal codes is 6000. Therefore, the number of transmit bursts per scan must be more than 6000, say 8192 as the nearest power of 2, and the scan length for a 2 μs transmit burst followed by a 2 μs receive burst is 32.768 ms. On the German Autobahn, two vehicles could easily be approaching each other with a relative velocity of 500 km/hour. The round-trip range is then reducing at the rate of 277.7 meters/second, or 9.1 meters in the 32.768 ms scan time, which is approximately range bins. Therefore, the method described above of integrating a target echo as it moves through successive range bins may be used together with Doppler phase de-twisting. The movement may be reduced by removing the radar host vehicle's own velocity, which is presumably known and made available to the radar through a suitable input (or else deduced from the static target background clutter). The most appropriate way to remove the radar's own forward movement is either to reduce the transmit bitrate by the Doppler Effect applied to the bitrate or to increase the receive sampling rate. The latter may be done in one of at least two ways. The first way is to apply a bitrate frequency signal to a single-sideband phasing-type modulator with a Doppler shift to obtain a Doppler pre-shifted sampling rate. The second method is to change the received sample rate by digital interpolation. The former method is simpler for removing the radar's own forward velocity, but the latter method may be used also for removing the target's Doppler Effect on the received bitrate, thus obviating the need to track fast targets across range bins. Thus, a Doppler to search for may be hypothesized and used not only to de-twist the phase of the incoming I,Q samples but also to interpolate between them to produce samples at a Doppler-shifted bitrate. When the Doppler-shifted sample rate samples are used for correlation, the target remains in the same range bin for the whole scan. The Dopplers to search for will be well known from previous scans as even with an unlikely 1 g acceleration or deceleration, the velocity change in 32.768 ms can only be +/−0.32 meters/second.

The table below indicates various choices for bitrate, range resolution and scan length while retaining the benefits Note the maximum target velocity in the last column above represents the velocity at which the target moves less than one range bin over a scan. Of course, the techniques described above may be applied to recognize targets traveling at much greater speeds.

It is possible to reduce the scan length by reducing the transmit burst length while still retaining code orthogonality. For example, if the transmit burst is 1 μs and the receive period is still 2 μs, the number of bits per transmit burst at 250 MB/S is reduced to 250. That is the maximum number of overlapping echoes that can be received at any time (refer to FIG. 5 to see this) and thus the number of orthogonal codes required for 12 transmitters is only 12×250=3000, so the scan length can be reduced to 4096×3 μs or 12,288 ms instead of 32.768 ms. Thus, the maximum velocity without range bin drift is raised from 30 Km/Hr to 80 Km/Hr at 300 m distance. It may also be realized that a MIMO radar with 8 transmitters and 12 receivers has substantially the same performance as a radar with 12 transmitters and 8 receivers, except that the number of orthogonal codes required reduces once more. In a system with 8 transmitters transmitting for 1 μs and 12 receivers receiving for 2 μs, the orthogonal code length is reduced to 2048 and the scan time at 250 MB/S reduces to 6.144 ms which is good for target velocities up to 160 km/Hr without correlating across range bins. By reducing the number of transmitters and their on-times, it may be possible to increase the power of each within the chip power dissipation limits and thereby improve radar sensitivity.

The long-range radar is expected to see a much greater dynamic range of signal variation than a short-range indoor radar.

Therefore, better code orthogonality is useful. Both the short range and long-range applications can use perfectly orthogonal Walsh-Hadamard codes as an alternative, in the manner next to be described.

Referring back to FIG. 5 to describe bit placement within successive transmit bursts, the last bit to be transmitted in successive bursts may be chosen to be the bits of a first one of an orthogonal code set code or its inverse. Thus, bits {b1(1), b1(2), b1(3) ... b1(2L)} constitute a first code of the set. The second last bits to be transmit in successive bursts {b2(1) ... b2(2L)} are then chosen to be a second code of the mutually orthogonal set. It may then the earliest echo that is received one bit period after the end of the transmit burst comprises, when viewed over a scan of 2L bursts, the first of the orthogonal codes and is orthogonal to the echo of delay 2 bits which it overlaps, because the overlapping bits of the 2-bit delayed echo constitute the second orthogonal code. Continuing in this way to assign different ones of the orthogonal code set to bits of the transmit burst result in all range bins being mutually orthogonal, at least when those targets have the same Doppler. The orthogonality or near orthogonality of 1/M in the case of sequences achieved by the invention is substantially better than the $1/\sqrt{M}$ cross-correlation that would achieve with random codes such as PRN sequences.

The disadvantage of unmodified Walsh-Hadamard codes as the orthogonal set is however that, unlike the M-sequence, they do not have a flat spectrum. Therefore, the choice of the orthogonal code set is preferably the M-sequence matrix extended with an extra column of zeros. Now the problem is that the transmit burst that contains bits from the column of zeros is unmodulated, or if the GSM precoding is used, it is a CW tone ¼ bitrate off center, which is less of a concern as regards DC offset. If, however, a more random pattern is desired for any reason, it may be realized that any code can be changed to its complement without affecting the radar function. Thus, it is possible to select a pattern of code complements that changes the column of zeros of the extended M sequence matrix to any designed burst pattern. This freedom may even be used to advantage in the short-range, low-power radar case as a means to get data out of the chip to a remote monitoring station with extra chip I/O's and without extra complexity. The data may simply be used to change the selection of code versus code complement for each bit position in the bursts to convey 48 bits of data over each half second scan, that is 96 bits/second per transmitter, which may be sufficient to be useful to alert a remote system of any significant change in the environment. When there are more codes available than used (e.g. when only 192 out of a possible 1024 are used) selecting different codes e.g. any one of four or their complements when the number available is more than four times the number needed, which results in conveying 3×48 bits of information per transmitter per scan. A remote receiver can receive the radar transmissions over a considerable range and correlate with all codes to extract the information. Higher data rates may be encoded by permuting the selection of 192 out of 1024 for use by 4 transmitters and the 48 bits per burst. The number of still-orthogonal selections is 1024×192 which has a maximum data encoding capability of 712 bits per scan, which may not be sufficiently greater than the 4×3×48 bits per scan with simple encoding to justify greater coding complexity.

If required, the short radar chip (or the long-range radar chip) could have a reverse wireless data link too, using the radar receivers to detect a non-radar-coded transmission having a special code that would switch the chip to a data reception mode for a predetermined time. This could be used, for example, as a means of wirelessly programming the chip with set-up data.

A large number of inventive radar variants and implementations have been described above, which may be adapted and modified in their details by a person or persons of normal skill in the art without departing for the spirit and scope of the invention as described the attached claims.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A multiple input, multiple output (MIMO) radar arranged on an integrated circuit chip, comprising:
a plurality of transmitters, each configured to transmit bursts of modulated radio signals, wherein each respective modulation is defined by a selected sequence of bits chosen from a corresponding code set of bits, wherein each selected sequence of bits represents a subset of the code set;
a plurality of receivers, each configured to receive the radio signals transmitted by the transmitters and reflected from a plurality of objects in an environment, wherein each object of the plurality of objects comprises a corresponding distance and commensurate round-trip echo delay; and
a processor configured to correlate the received radio signals with the selected sequences of bits to determine corresponding round-trip echo delays and thus the corresponding distances, wherein each respective sequence of bits is chosen from the corresponding code set such that the respective sequences of bits exhibit lower cross-correlation than a pseudo-random generated selection of bits.

2. The MIMO radar of claim 1, wherein each transmitter of the plurality of transmitters is configured to digitally modulate the transmitted radio signals, and wherein each transmitter is configured to transmit the modulated radio signals for a selected duration for a selected transmit duty cycle.

3. The MIMO radar of claim 1, wherein the lower cross-correlation comprises zero cross-correlation, and wherein the subsets are mutually orthogonal.

4. The MIMO radar of claim 1, wherein the lower cross-correlation comprises a cross-correlation of +/−1/M, and wherein M is the length of the code subset and the subsets are different shifts of an M-sequence.

5. The MIMO radar of claim 1, wherein the processor comprises a Fast Walsh Transform (FWT) engine for performing the correlations.

6. The MIMO radar of claim 1, wherein the processor is configured to improve a level of orthogonality between a first subset and a second subset by removing signal values from the received radio signals that are associated with already identified targets to produce a residual of the received radio signals, and wherein the processor is configured to correlate the residual of the received radio signals such that additional targets are identified.

7. The MIMO radar of claim 1 comprising a semiconductor chip, wherein the plurality of transmitters, the plurality of receivers, and the processor are arranged on the semiconductor chip, and wherein the semiconductor chip comprises a metal layer comprising a plurality of dipole antennas, and wherein each of the plurality of dipole antennas is coupled to a respective one of either the plurality of transmitters and the plurality of receivers, such that each of the transmitters and receivers is coupled to a respective dipole antenna of the plurality of dipole antennas.

8. The MIMO radar of claim 7, wherein the plurality of dipole antennas comprises six dipole antennas, and wherein each of the dipole antennas comprises a bow-tie shape.

9. The MIMO radar of claim 7 further comprising a reflector, wherein the plurality of dipole antennas are arranged as a linear array of antennas, and wherein the reflector is position with respect to the linear array of antennas such that a directivity of the linear array of antennas is controlled.

10. The MIMO radar of claim 1, wherein the processor is configured to correlate the received radio signals for a selected quantity of range bins during a radar scan, wherein the product of the quantity of range bins with the quantity of transmitters of the plurality of transmitters is less than a quantity of transmission bursts per radar scan, and wherein at least one of the quantity of range bins, the quantity of transmitters, and the quantity of transmission bursts per radar scan is selected such that each selected subset is orthogonal to every other selected subset.

11. The MIMO radar of claim 1, wherein the plurality of transmitters comprises a first transmitter and a second transmitter, wherein a first subset selected for the first transmitter is inverted according to a first inversion pattern, and wherein a second subset selected for the second transmitter is inverted according to a second inversion pattern such that the first subset is orthogonal to the second subset.

12. A method for improving correlation of received radio signals in a radar system, the method comprising:
providing a radar system comprising (i) a plurality of transmitters configured to transmit bursts of modulated radio signals, wherein each respective modulation is defined by a selected sequence of bits chosen from a corresponding code set of bits, (ii) a plurality of receivers configured to receive the radio signals transmitted by the transmitters and reflected from a plurality of objects in an environment, wherein each selected sequence of bits represents a subset of the code set, wherein each object of the plurality of objects comprises a corresponding distance and commensurate round-trip echo delay; and
correlating the received radio signals with the selected sequences of bits to determine corresponding round-trip echo delays and thus the corresponding distances, wherein each respective sequence of bits is chosen from the corresponding code set such that the respective sequences of bits exhibit lower cross-correlation than a pseudo-random generated selection of bits.

13. The method of claim 12, wherein each transmitter of the plurality of transmitters digitally modulates the transmitted radio signals, and wherein each transmitter transmits the modulated radio signals for a selected duration for a selected transmit duty cycle.

14. The method of claim 12, wherein the lower cross-correlation comprises zero cross-correlation, and wherein the subsets are mutually orthogonal.

15. The method of claim 12, wherein the plurality of transmitters comprises a first transmitter and a second transmitter, wherein a first subset selected for the first transmitter is inverted according to a first inversion pattern, and wherein a second subset selected for the second transmitter is inverted according to a second inversion pattern such that the first subset is orthogonal to the second subset.

16. The method of claim 12, wherein correlating the received radio signals comprises correlating the received radio signals with a Fast Walsh Transform (FWT) algorithm.

17. The method of claim 12, and and wherein the method further comprises improving a level of orthogonality between a first subset and a second subset by (i) removing signal values from the received radio signals that are associated with already identified targets to produce a residual of the received radio signals, and (ii) correlating the residual of the received radio signals such that additional targets are identified.

18. The method of claim 12, wherein the method further comprises (i) correlating the received radio signals for a selected quantity of range bins during a radar scan, wherein the product of the quantity of range bins with the quantity of transmitters of the plurality of transmitters is less than a quantity of transmission bursts per radar scan, and (ii) selecting at least one of the quantity of range bins, the quantity of transmitters, and the quantity of transmission bursts per radar scan such that each selected subset is orthogonal or nearly orthogonal to every other selected subset.

* * * * *